US008867857B2

(12) United States Patent
Santos et al.

(10) Patent No.: US 8,867,857 B2
(45) Date of Patent: Oct. 21, 2014

(54) METHOD FOR RESTORATION OF BLURRED BARCODE IMAGES

(75) Inventors: Eduardo Telmo Fonseca Santos, Salvador-BA (BR); Eduardo Manuel de Freitas Jorge, Salvador-BA (BR); Gustavo de Almeida Neves, Salvador-BA (BR); Geovane dos Santos Anunciacao, Salvador-BA (BR); Luciano Reboucas de Oliveira, Salvador-BA (BR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/338,988

(22) Filed: Dec. 28, 2011

(65) Prior Publication Data
US 2013/0170765 A1 Jul. 4, 2013

(51) Int. Cl.
G06K 9/00 (2006.01)
G06K 9/66 (2006.01)
G06K 7/10 (2006.01)
G06K 9/22 (2006.01)

(52) U.S. Cl.
USPC ....... 382/255; 382/190; 235/454; 235/462.25

(58) Field of Classification Search
USPC ............. 382/190, 321, 255; 235/454, 462.25, 235/462.46, 462.1, 462.08
See application file for complete search history.

(56) References Cited

U.S. PATENT DOCUMENTS 6,152,371 A * 11/2000 Schwartz et al. ........ 235/462.45
7,237,721 B2 * 7/2007 Bilcu et al. .................... 235/454
8,199,246 B2 * 6/2012 Ono ............................... 348/348
8,320,695 B2 * 11/2012 Park .............................. 382/255
2005/0011957 A1 * 1/2005 Attia et al. ............... 235/462.46
2006/0202039 A1 9/2006 Wang et al.
2007/0146689 A1 * 6/2007 Araki et al. ................ 356/124.5
2009/0148061 A1 * 6/2009 Zalevsky et al. ............. 382/264
2009/0152358 A1 * 6/2009 Epshteyn et al. ......... 235/462.2
2010/0165160 A1 * 7/2010 Olmstead et al. ............. 348/296
2011/0007967 A1 1/2011 Söderberg et al.
2011/0068173 A1 3/2011 Powers et al.
2012/0018518 A1 * 1/2012 Strom et al. ............. 235/462.04
2012/0170862 A1 * 7/2012 Park .............................. 382/255

FOREIGN PATENT DOCUMENTS

BR PI 0603273-7 1/2008
WO 2011/011051 1/2011

OTHER PUBLICATIONS

Douglas Chai et al., "Locating and Decoding EAN-13 Barcodes from Images Captures by Digital Cameras", IEEE, 2005, 5 pages.
Tiago Henrique Tudisco dos Santos et al., "Processamento Digital de Imagens de Códigos de Barras usando Telefones Celulares", VI Workshop de Visão Computacional, Jul. 2010, 6 pages.
Steffen Wachenfeld et al., "Robust Recognition of I-D Barcodes Using Camera Phones", IEEE, 2008, 4 pages.
L. Dumas et al., "A Robust Method for Blind Deconvolution of Barcode Signals and Non-Uniform Illumination Estimation," 17th IEEE International Conference on Image Processing (ICIP), Sep. 2010, 4 pages.
Todd Wittman, "Deblurring and Restoration in Barcode Signal Processing," SIAM Conference On Imaging Processing, 2004, 1 page.

* cited by examiner

Primary Examiner — Andrae S Allison

(57) ABSTRACT

A method for restoring an image of a blurred barcode includes capturing the image, restoring the image by selecting one Optical Transfer Function (OTF) in a database and performing deconvolution on the image, decoding the barcode in the restored image to return numbers represented by the barcode, and displaying the returned numbers.

18 Claims, 24 Drawing Sheets

With blurring effect      After deconvolution.

pixel      pixel after convolution with PSF

METHOD FOR RESTORATION OF BLURRED BARCODE IMAGES

BACKGROUND

1. Field

The present invention relates to the field of human interaction with mobile devices, more specifically the interaction done by the automatic recognition of barcode images captured by the camera integrated in portable devices, particularly mobile phones, smartphones, Personal Digital Assistants PDAs, portable digital camera, among others.

The present patent application relates to a method to effect the reading of barcodes by means of portable devices with digital cameras. The present invention provides a method to restore barcode images damaged by the blurring effect due to the lack of focus of the captured images with low cost cameras with fixed focus. The proposed method treats the image of barcodes in order to enable correct decoding of its content.

2. Description of the Related Art

Currently, barcode technology is part of various sectors of the commercial, industrial and financial. We find barcodes to identify the products of a supermarket, a library of books on machine of an industry, in bank bills, equipment of an organization, employee badges in a company, etc.

In general, barcodes representing unique information via the widths of bars and spaces are arranged in a parallel horizontal pattern. This type of barcode has only one dimension and is known as one-dimensional barcode or linear barcode. An example of linear barcodes includes the EAN-13, Code 128, and Code 39, among others.

More recently, barcodes have emerged that are capable of storing information in vertical and horizontal patterns, and are called 2D barcode or two-dimensional barcodes. They can store a lot of information. As an example we can mention the QR Code, DataMatrix, PDF417, and Code 49, among others.

To perform the reading of the barcode, optical reading equipment based on what is known as a scanner or barcode reader is used. The patent document US 20110068173A1 entitled SYSTEM AND METHOD FOR RECOGNIZING DEFORMED LINEAR BARCODES FROM A STREAM OF VARIED-FOCUS VIDEO FRAME, published on Mar. 24, 2011, proposes a system for recognizing barcodes. This system performs the reading of multiple frames shot by the camera in the preview mode, wherein at least one of these tables must have a barcode. This system US20110068173A1 document tries to estimate the level of blurring caused by lack of focus in video frames. This process also tries to estimate the identity of the barcode. The method taught by document US20110068173A1 locates the region containing the barcode. Another operation performed by the document US20110068173A1 is to create a geometrical model barcode with deformities found in the barcode, which, in turn, is used to restore the barcode. These deformities can be caused by the curvature of the packaging, the level of tilting the camera, and ambient light, among other factors. However, the cited patent has no details on creating this geometric model. Document US20110068173A1 also estimates the level of blurring, where the blurring level is high, the probability of success in decoding the barcode this frame will be low, and this, in turn, is dropped. This estimation is performed by calculating the differences between frames filmed and by the same, it attempts to obtain the radius of blur present in the barcode, where this threshold is less than the predetermined defocus then is effected reading the barcode. The document US20110068173A1 does not present a method that is able to restore the blur in the picture of the barcode, it just checks if the image has an ideal focus, otherwise it discards the same. With this, only the barcodes present in sharp images are decoded.

The international patent application WO2011011051A2, IMAGE-BASED BARCODE READER, published on Jan. 27, 2011, discloses a method that performs the decoding of barcodes present in images from deformable models, where from the parameterization of these attempts through the maximum similarity obtain the digits of the barcode without turning into bits the image with the barcode and using all the pixel information in grayscale. For decryption to be successfully performed, it is necessary that the location of the barcode is within a reasonably precise location where a tolerance is equal to twice the width of the thinnest bar at either end. Because the sizes of labels on which barcodes are printed do not have a pattern, this method may limit the decoding of barcodes in situations where the widths of the bars do not match the submitted location tolerance. Therefore, the solution proposed in International Patent Application WO2011011051A2 is not adaptive with respect to decoding barcodes with varied geometries. To perform the decoding of the barcode, the method proposed by said patent application WO2011011051A2 tries to obtain digits comparing pixels of the image of the barcode with predetermined templates, where they are scaled and translated to resemble those digits into analysis. The decoded digit is the one with the highest likelihood. This process may be slower than the use of filtering, since the process of obtaining the digit corresponds to the model is computationally expensive.

The patent document US20110007967A1 entitled: METHOD AND ARRANGEMENT FOR RETRIEVING INFORMATION COMPRISED IN A BARCODE, published on Jan. 13, 2011 presents a method that returns information comprised in a barcode. This method analyzes the first image to see if it has a barcode, and checks the quality of this region where the barcode is located. If the first picture has a barcode, then a second image is acquired, where the quality of this image is greater than the first image and the second region with the barcode overlaps at least a portion of the first region. Then, the decoding is effected with the barcode from the second image. The document US20110007967A1 tries to find the barcode on a first image with low quality. To locate the barcode, a search is conducted for rectangular regions in the image using a sliding window. The following extract is then associated with the barcode and the method SVM (Support Vector Machine) is performed to evaluate whether or not that window has a barcode. If this is found, then an image with high quality is obtained. This is achieved by using quality improvement techniques such as auto-focus, flash, and lighting techniques, among others. Said document US20110007967A1 presents no method for restoring a damaged image nor proposes an adaptive method for obtaining the information represented by the barcode.

The Brazilian patent document PI0603273A, entitled System and Method that uses a Software to Perform Decoding Barcodes Directly on Mobile Communication Devices Equipped with Digital Camera, published on Jan. 15, 2008, describes a method for decoding a barcode from images captured by a digital camera of mobile communication devices. This sends the result of decoding to a server via a network connection, which, in turn, will provide product information related to the number represented by the decoded barcode. If there is a network connection, one can store the result of the decoding for future reference. The decoding is performed in real time by analyzing the intercepted frames in the preview mode, and can also be performed by capturing a high resolution image from the button press. After getting the image with the barcode, it begins the process of image processing, recognition and decoding. The Brazilian document PI0603273A proposes methods for turning the image into bits, correct lighting and remove noise, but does not present details on the operation of these. This document also does not present a solution for restoration of blurred images and has no adaptive methods for converting image information represented in the barcode.

The American document US007237721B2 entitled: IMAGE PROCESSING FOR PATTERN DETECTION published on Jul. 3, 2007 describes a method that detects patterns such as barcode in an image. This method finds the points of starting and ending patterns in a region of an image, tries to estimate the PSF (Point Spread Function—Point Spread Function (PSF) that is the degree to which an optical system blurs (spreads) a point of light. PSF is the inverse Fourier transform of the transfer function of optical frequency domain) from the start and end points detected, and restores the region of the image using the PSF obtained. The method proposed in this document US007237721 B2 assumes that the PSF is Gaussian, which is not always correct and that may limit the restoration of the barcode. Furthermore, the method performs deblurring PSFs with 1 L along scan lines, but the PSF to restore an image should be 2 L, which limits the power in the information retrieval barcode. Another limitation of the proposed method is the use of a PSF with parameters determined for the picture, but the parameters of PSF should vary over the image to perform a reconstruction closer to the ideal.

The document US20060202039A1 entitled CAMERA-BASED BARCODE RECOGNITION), published Sep. 14, 2006, discloses a system for identifying a barcode using digital cameras. The document US20060202039A1 uses methods that reduces noise and increases the contrast between the bars, but it does not describe in detail how these operations are performed. It provided a method for locating the barcode in any orientation and position, but for this, it is necessary that the barcode is framed in the center of the image. The method of locating document presented by US20060202039A1 is inefficient due to the high computational cost and cannot identify the barcode in degraded images. For turning the image into bits, the document US20060202039A1 does not use adaptive methods, causing the captured image to be in optimum illumination for turning into bits efficiently. The document also does not propose a method for restoring blurred images.

The American US20050011957A1 document entitled: SYSTEM AND METHOD FOR DECODING AND ANALYZING BARCODES USING A MOBILE DEVICE, published on Jan. 20, 2005, proposes a system and method for decoding barcodes. This document provides a system and method that attempts to improve the image captured by a camera integrated into the mobile device and then tries to get the information represented by the barcode present in this image. The information obtained is sent to a server through a wireless connection, which performs a query on the content corresponding to the number decoded. This content, in turn, is transmitted to the mobile device. Document US20050011957A1 shows a block diagram describing a process used to correct the image and decoding the barcode, but does not detail the procedures shown in this block diagram. The procedure described in that document gets the pictures filmed by the camera integrated into the mobile device and from these numerous attempts performs decoding with different parameters until the barcode is successfully decoded or until all parameters are used. The document mentions US20050011957A1 methods to remove distortions which may damage the image of the barcode and, in turn, hinder the decoding thereof. These methods are used for: perspective correction, removal of shear; correcting problems associated with lighting, and adjustable focus, among others. However, no details are given about the operation of these methods, making it not possible to make an evaluation. The document does not describe US20050011957A1 step for obtaining the cut-off threshold between black and white, which is used in the conversion process for the pixels bars. This document does not mention any method to find or identify in advance the barcode before decoding, it does not detail the process of getting the bars and it does not present a method for restoring blurred images.

The article "Robust Recognition of 1-D Barcodes Using Camera Phones" Wachenfeld Steffen et al., Published in 2008 in IEEE, describes an algorithm for decoding barcodes using camera phones. The algorithm described by the article cited in this paragraph uses the techniques of image processing such as Hough transforms, wavelets to localize the barcode patterns and morphological operations. However, this article does not describe any method for restoring images barcode damaged by the effect of blurring, and only details the procedures used in localizing the barcode, digitizing the scan line and identify digits represented thereby. In turn, such procedures have been shown to be ineffective in decoding barcodes present in damaged images, because the proposed procedures are not adaptive enough, making it less efficient for decoding.

The article "A Robust Method for Blind Deconvolution of Barcode Signals and non-uniform Illumination Estimation," L. Dumas et al., 17th IEEE International Conference on Image Processing (ICIP), September 2010, Hong Kong, available via the link http://www.math.uvsq.fr/~dumas/Proc8.pdf, proposes a method that restores the image of the barcode by removing noise and blurring using blind deconvolution. The method proposed by the article tries to remove distortions caused by non-uniform illumination. This method is based on a genetic algorithm that combines optimization applied to discrete and continuous data strongly affected by the presence of noise and blurring effect. The article describes a method for blind deconvolution based on a genetic algorithm whose solution is a target binary image, i.e., the parameters of the PSF, illumination and adjustment are also estimated automatically so as to minimize a cost function. Note that the uncertainty in the speed of convergence and the processing time of genetic algorithms may limit its applications in portable devices.

The article "Deblurring and Restoration in Barcode Signal Processing", Todd Wittman, published in 2004 in SIAM CONFERENCE ON IMAGING PROCESSING 2004, available through the link http://www.math.ucla.edu/Wittman~/thesis/bars_poster. pdf, presents a technique of removing blurring based on the minimization of the total variation for restoring images of barcodes. The approach can also be classified as blind deconvolution, because estimates of the parameters of the PSF and barcode together. The minimization of a cost function is performed using classical optimization methods, such as Newton and "steepest descent", which though more efficient than genetic algorithms, suffer from the limitations of local methods and also imply a computational cost that may limit its applicability in portable devices. Another limitation of this method is to assume that the PSF is a Gaussian function 1D, which is not always true.

The article "Digital Image Processing Barcode using Mobile Phones" James Tudisco Henrique dos Santos and Almir Olivette Artero, published in 2010 at the Sixth Workshop on Computer Vision, July 2010, held in Presidente Prudente, São Paulo, proposes the use of mobile phones with integrated digital cameras to decode barcode EAN-13. The article describes a method to locate and decode barcodes. The Sobel operator is used for edge detection to locate the barcode and calculate the direction of the edges from the gradients. This article presents no method to correct problems related to lack of focus, problems associated with lighting, and presence of noise, among others. The turning into bits described in this article may be ineffective because it has a fixed threshold and thus the results of this can be harmed under different lighting conditions.

The article "Locating and Decoding EAN-13 Barcodes from Images Captured by Digital Cameras" by Douglas Florian and Chai Hock, 2006, proposes a vision-based technique to locate and decode barcodes. The article mentioned in this paragraph presents no technique for treating distortions in the image, and this has emphasized the procedure for locating the barcode.

The above documents have methods that perform the decoding barcode and restore damaged images due to the presence of noise, problems related to the focal length, the problems associated with ambient lighting, low contrast, and perspective distortions, among others. Due to these problems, it is complex to perform decoding of barcodes from images captured by low cost cameras because, due to the inferior quality of these cameras, images captured easily present the problems cited. Most of the documents cited above can perform the decoding of barcode under certain circumstances. However, for the decoding to be successful, it is necessary that the image with the barcode is above an acceptable threshold. Some of those documents mention the need to carry out a pretreatment on the captured image for decryption to be successful. But these papers do not detail the procedures necessary to restore the image, just adding a sort of black box indicating the need to improve the quality of the captured image. One of the solutions of the prior art is to estimate the level of blurring, where decoding is only performed if this is smaller than a predetermined threshold.

In contrast, the present invention provides a solution to technical details can restore images damaged by the effect of blurring and provides a robust method for obtaining the number represented by the barcode present on the captured image.

The solutions embodied by the present invention make it possible to decode the barcode present on images taken by cameras which have low cost, and fixed focus. The present invention has a camera calibration procedure that creates a base of PSF's. These reflect precisely the incidence of the effect of blurring at a certain point, from a certain distance. The PSF's in this database will be used in the operation of deconvolution that removes the blurring effect and restore the image with the barcode. The present invention has adaptive methods for obtaining the bars so as to provide greater robustness under varying conditions. The decoding of the barcode carries out a validation procedure and blending between different results, which, in turn, enhances the probability of success in getting the numbers represented by the barcode.

SUMMARY

Additional aspects and/or advantages will be set forth in part in the description which follows and, in part, will be apparent from the description, or may be learned by practice of the invention.

The present invention utilizes techniques of image processing and computer vision to extract the sequence number that is contained in a barcode image. These techniques make it possible to segment the image of the barcode, to remove the blurring effect (deblurring), to make adaptive digitizing of the image, converting the barcode digits, and effecting the validation of the same.

The decoding method of the present invention was developed to run on a portable device which captures an image of a barcode. For devices that have no auto focus camera, the acquired image needs to go through a pre-processing to remove the blurring due to defocusing, compensating for wear caused by external interference, and making corrections to improve the quality and making the correct decoding of the barcode and validation.

The present invention provides the decoding of barcodes, restoring blurred images that have a barcode and decoding them in real time via portable devices that have a low cost digital camera. The system tries to achieve the ideal focused image and perform the decoding of the barcode pattern EAN-13 standard which is commonly used for identification of products. This invention aims to provide a low-cost, efficient, and effective process, allowing consumers to check prices anywhere they are.

The present invention also allows the user to use cameras with a fixed focus to read the barcode. One should frame the barcode within the limits of a previously positioned sight.

BRIEF DESCRIPTION OF THE DRAWINGS

The objectives and advantages of the invention will become more apparent from the following detailed description of an exemplary embodiment of the invention and the accompanying drawings by way of non-limitative example, wherein.

DETAILED DESCRIPTION

Figure 1A:
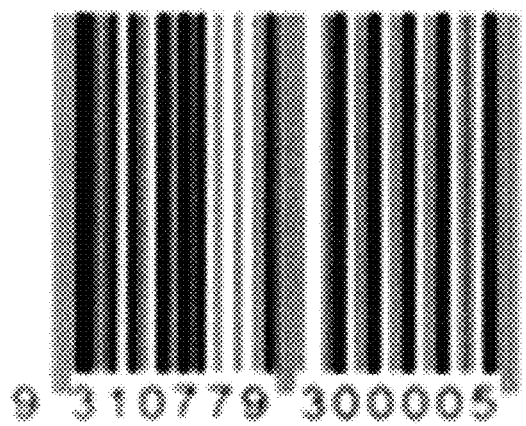
FIG. 1A shows an example of a blurred picture.

Reference will now be made in detail to the embodiments, examples of which are illustrated in the accompanying drawings, wherein like reference numerals refer to the like elements throughout. The embodiments are described below to explain the present invention by referring to the figures.

Description of Preferred Embodiments of the Invention

The system of the present invention is implemented using the methods developed for restoring images of barcodes damaged by the effect of blurring and decodes them from a portable digital camera equipped with low cost. With this, it is possible to develop a method to read barcodes in images captured by a camera with fixed focus, whose quality is impaired due to a possible incorrect focal length.

Problems Solved by the Invention

Despite technological advances, mobile devices still have hardware with relatively limited resources to implement algorithms that perform advanced calculations. Therefore, the present invention applies processing techniques in order to reduce the computational cost, enabling a reduction in decoding time and minimizing the use of handheld processor, plus save memory, thus optimizing the use of resources by increasing process efficiency described herein. These techniques also provide an increase in strength of the barcode reader, and make it possible to increase the number of frames analyzed for the same period of time.

In portable devices with cameras without auto-focus, some images taken with the camera a blurry because the camera cannot scan small objects clearly, as is the case with some sources, where, as the camera approaches, they remain blurry and unreadable. Some packaging products have a barcode so small that when the camera is above a certain distance, it is not possible to distinguish their bars due to an insufficient amount of pixels, and when the camera is too close, the object can be blurred. This problem is solved by using the deblurring process described in this disclosure, thus obtaining an image with the focus corrected by image processing.

For cases in which the captured image of the barcode is not captured under appropriate conditions, the process may result in loss of some of the barcode information. This type of problem can be caused by the lighting conditions of the environment, which may cause smudges of light, excessive shadows, and low sharpening, among others. Also very common are situations where the barcode is already damaged due to several factors, among which are: poor print quality, surface aging, and damaged packaging or container, among others. To improve the effectiveness of the present invention, methods were created that perform the correction of possible damage above. These methods are based on techniques of stacking, i.e. calculating the average of several adjacent lines in the image of the barcode, thereby improving the signal/noise ratio of the image.

Aiming to improve the effectiveness of the present method for reading barcodes even under unfavorable conditions, a set of methods are applied to the image. The barcode is divided into vertical slices, and each of these is processed separately. For the values of the bars, vertical sub-regions are defined and, in turn, the threshold of black and white for each sub-region is calculated. A set of weights which adjust the threshold level of illumination present in the image are applied at threshold. With this, the effects caused by poor image quality and/or external factors are eliminated, allowing reading of the barcode.

The packaging of the products has different shapes. For example, images of packaging with a curvilinear surface distort the size of the bars, hampering thereby the decoding of the barcode. To solve this problem, the present invention utilizes effective and efficient algorithms to estimate the size of the bars, considering a threshold based on the specific characteristics of the dimensions of the bars used in EAN-13.

Technical/Functional Advantages of the Invention

Decoding of blurred barcodes: The use of methods to perform the deconvolution of blurred image using the Point Spread Function (PSF) or Optical Transfer Function (OTF) allow us to estimate an image closer to the ideal for barcode decoding. This removes the effect of blurring caused by the scattering of the pixels of the image of the barcode, and increases the success rate of this method.

Versatility to adapt in different cameras: A bank's PSF can be estimated for each different type of camera, thus enabling the same deblurring process to be used with different cameras. This confers versatility to the method, since it can be used without major changes in various portable devices.

Possibility of using devices with low cost cameras: image correction enables the use of devices with no auto-focus cameras or other optical limitations because deconvolution using the PSF or OTF aims to minimize the blurring effect caused by optical arrangement/camera. The process described in this disclosure acts as an algorithm of digital signal processing that simulates the effects of corrective lenses applied to the captured image. Thus, we obtain an image more suitable for the decoding of barcodes, even with some limitations in image capture, thus also enabling the use of low cost cameras.

Low computational cost: Seeking to improve the process of reading the barcode, programming practices were used that optimize the performance of computational instructions, such as using fixed point instead of floating point, and bit manipulation used to perform some operations using the minimum possible instructions to scan or copy the pixels of an image, among others.

Reading barcode efficient and effective: Reading is efficient because it minimizes the use of computing resources, and is effective because it succeeds in most attempts at reading, making it possible to perform decoding of barcodes with different sizes, any positioning, any angle, and high perspective in environments with different lighting.

Real-time processing: No need for a photo to be taken to perform decoding. The system performs the entire procedure in real time by analyzing the frames obtained in preview mode. With this it was possible to increase the robustness of the algorithm, since a new frame is processed repeatedly in a preview mode until the read is successful. Furthermore, depending on the resolution supported in the preview mode by the handheld camera, it is possible to further enhance the effectiveness of the barcode reader.

Elimination of useless regions: regions outside the boundary found are excluded from reading, thereby preventing the processing of regions that do not belong to the barcode. This improves the efficiency of the reader since less parts of the image are analyzed, thereby diminishing the processing time. Efficiency is increased because elements that negatively influence the cutting definition of the limits of the region of the barcode are eliminated, so that only those bars which contain relevant information remain in processing, thus increasing the probability of success in decoding.

Identification Barcode: So that the decoder is not run on images that do not have barcodes, the process makes up a pre-analysis within the limits of the barcode. The contrast level is checked, where, for cases in which this contrast is very low, the image is immediately discarded, so the reader does not attempt to perform any decoding that could be unsuccessful, and with it, avoiding wasting time computing something that would not be successfully decoded. This increases the efficiency in the sense that, after dropping the image, the process will restart and therefore a new framework which can have a better quality and greater chances of decoding is provided.

Horizontal slicing Barcode: The barcode is sliced horizontally and reading is performed on each of these slices individually. With this, a better efficiency may be obtained, since the number of samples was increased, which led to an increase in the percentage of correct answers. Where there is no success in decoding a slice, another is selected until the code is decoded or until all slices have been selected. The number of slices is adjusted according to reading performance, so that during the process slices of different positions and sizes are obtained, thus increasing the likelihood of successful decoding.

Adaptive method for turning into bits, or digitizing: phase occurs during the definition of a barcode. This step is necessary to determine a cut-off threshold level to separate the white from the black level in the image of the barcode grayscale. Methods were created that calculate the threshold of a flexible and adjustable. This threshold adjusts to ambient lighting. This is because the slice to be decoded is divided into vertical regions and for each of the subregions a threshold is obtained as the intensity of its pixels. Moreover, this threshold is assigned weights that adapt to the ambient light threshold. These weights are defined through extensive testing in which it was possible to extract the appropriate weight to each type of illumination. In the process of reading, the number of vertical slices is adjusted, computing new thresholds for black and white.

Reading barcode on non-planar surfaces: The packaging of the products has different shapes. Barcodes can be found on packaging products with rounded surfaces, oval, or even packages which are flexible plastic bags which surface has a specific shape. To increase the robustness of the process, an adaptive method enables decoding of barcodes on surfaces with different formats. Depending on the bar surface, the dimensions of the bars may increase or decrease depending on the perspective caused by the shape of the package. Because of this estimate, a size reference bus performs decoding in each image region.

Reading the barcode with perspective: to increase the effectiveness of the reader, techniques enable the decoding of barcodes in perspective. This was possible because the horizontal slicing selects slices of the barcode that are in the same perspective favoring decoding barcodes with high perspective.

Adaptive method for obtaining the bars: in order to increase the level of accuracy of decoding, an adaptive method converts pixels in bars. This method attempts to compensate for problems related to leakage of pixels in its neighborhood, and checking for bars that were too thin or wide.

Validation result: in order to show only the correct values, the present invention has validation methods that verify the guard bars of the code and check digit. Soon after the establishment of the bars is checked, the guard bars are verified. After all digits have been decoded, the check digit is checked. If polling is correct, the value returned is decoded and the result is displayed.

Using hardware device with high mobility: the invention can be performed in a small and lightweight portable device that can be uploaded to different places without taking up much space. With this there was obtained a portable and lightweight device that performs the barcode reading in real time, providing convenience to the user to, for example, consult product prices.

Thus, a preferred embodiment of the present invention is obtained by methods to restore blurred images and perform the decoding of barcodes present on degraded images with execution in real time from an integrated system of hardware and software.

Figure 1B:
FIG. 1B shows an example of a focused photo.

FIGS. 1A and 1B illustrate images of blurry pictures and focused pictures, respectively.

Figure 1C:
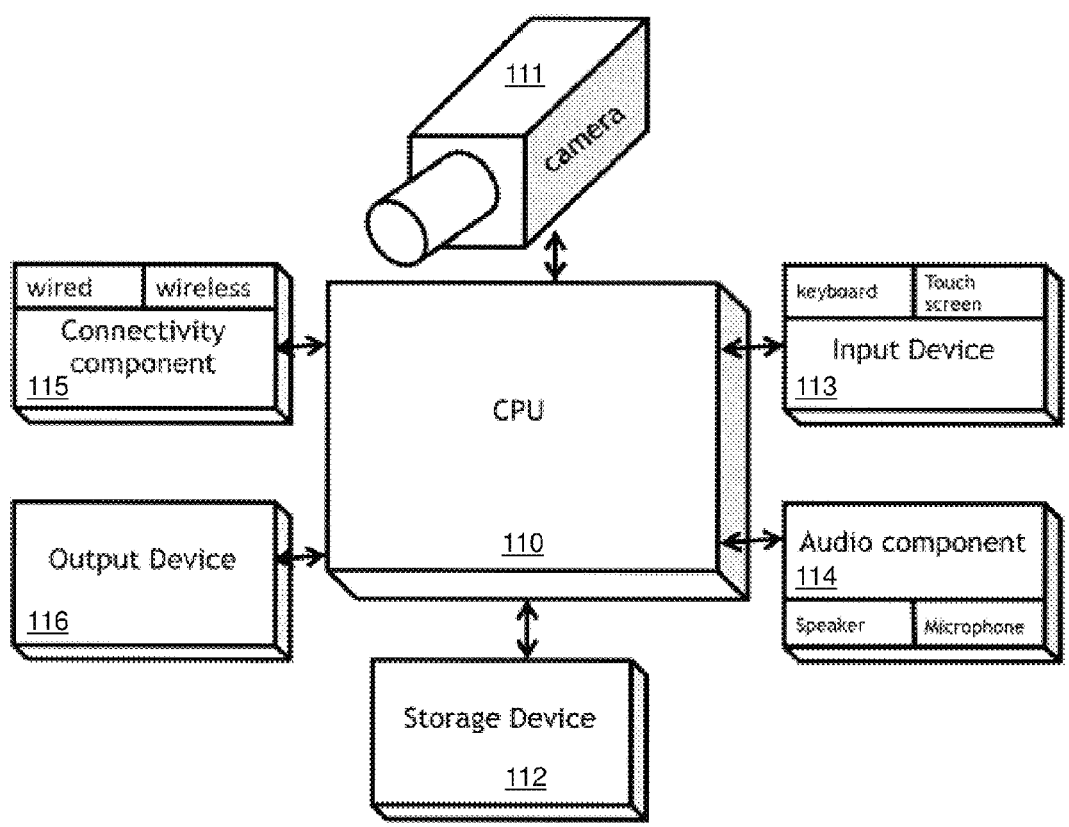
FIG. 1C presents a generic model of the portable device in which the method works.

The hardware required to realize the system of the present invention is a portable device, where its main characteristics are illustrated in FIG. 1C. The CPU (110) (Central Processing Unit) is responsible for performing the necessary instructions for managing the camera, and make the computations for image processing with the barcode. The camera (111) is responsible for capturing the images. The storage medium (112) serves to store information and data including the code decoded, and item, among others. The hardware also comprises information input devices (113) and audio components (114). Through some connectivity component (115) is possible for communication between the application and a remote database that has information about the products. The display means (116) is used to view the pictures captured by the camera device.

The system of the present invention begins at the moment when the user activates it to a portable device in which it was previously installed.

Figure 2:
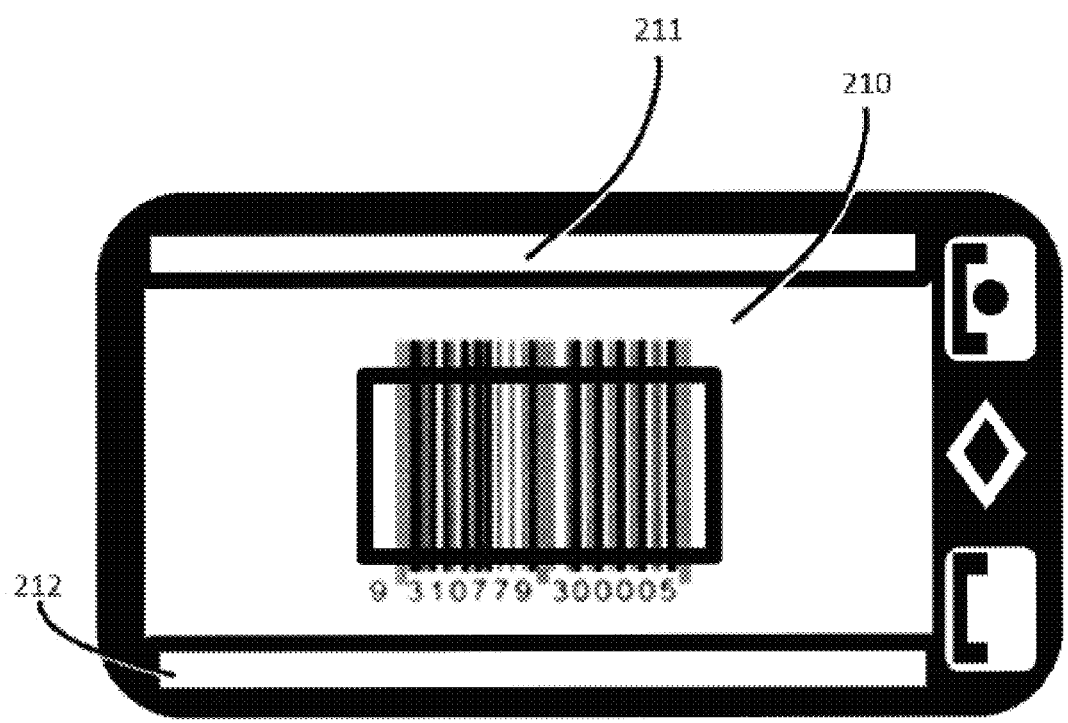
FIG. 2 illustrates the interface to be presented to the user.

FIG. 2 shows a running system. After this initialization, the digital camera capture will be performed and the preview will start displaying the pictures filmed in display (210) of the device at a certain rate (eg 30 FPS). The embodiment of the described system has two status bars, where the upper bar (211) indicates the status of the barcode reader, and lower bar (212) presents the results of partial decoding.

The present invention has as its main goal to enter the functionality of a reader-dimensional barcode on a portable device equipped with a digital camera with fixed focus. In turn, it is possible to create a low cost solution that is able to perform the functions of equipment barcode readers, commonly found in commercial establishments and are used by customers to perform the query on the value of the product.

The solution presented by the present invention has the principle effect the deconvolution process to remove the effect caused by blurring, by warping the image so that there is no degradation in the original image.

Figure 3:
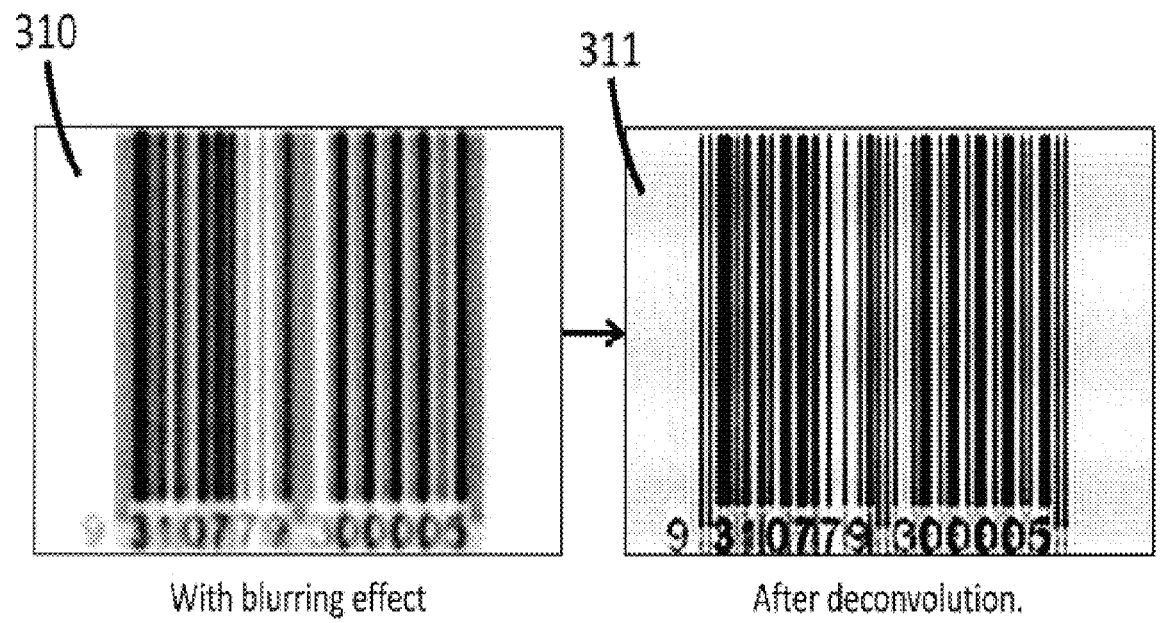
FIG. 3 shows the barcode and the result of blurred restoration thereof.

FIG. 3 shows the result of restoration image of a barcode. The barcode affected by the blurring effect (310) is unfocused, and its bars no longer represent the original information. After deconvolution, the barcode has become more clear (311) and much of the original information is recovered.

Figure 4:
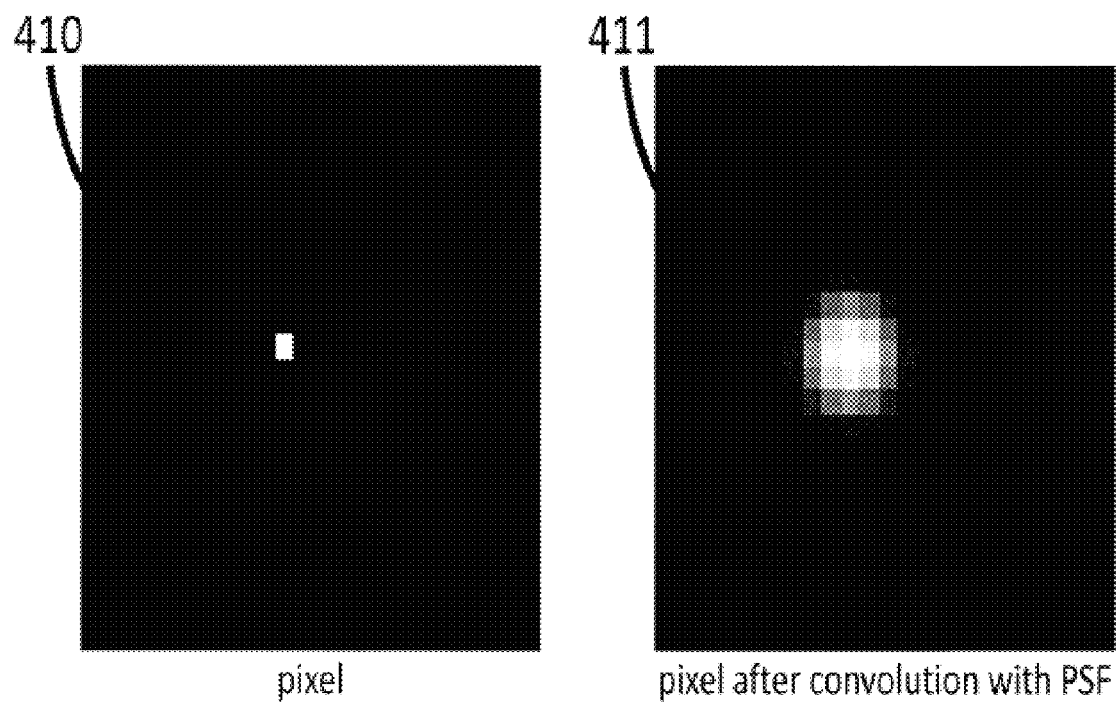
FIG. 4 shows a focused pixel and the result of this after convolution with the PSF.
Figure 5:
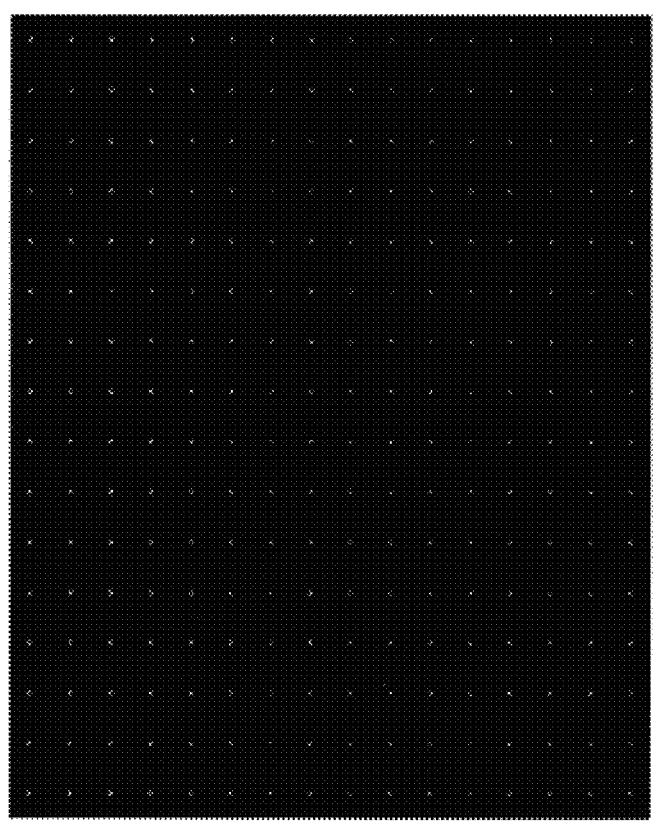
FIG. 5 illustrates the points to be used in extracting the PSF's.

The image restoration is closely linked to the PSF. The PSF makes the pixels of an image that are focused scattered in the neighboring region, creating the effect of blur. This effect is illustrated in FIG. 4 which shows the representation of pixel (410) and its scattering after convolution (411) with the PSF.

Figure 6:
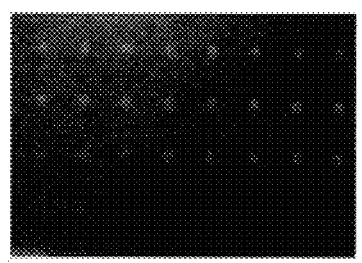
FIG. 6 shows the result of the capture of points by the target camera.

For restoration of the image, it is first necessary to estimate the PSF that caused the scattering of pixels and then do the reverse process. Therefore, the method is capable of extracting static PSF's for use in deconvolution. Said method is based on the capture of images with black and white dots which represent pixels (510). An image is captured with the camera target. The result is shown in FIG. 6, whose pixels have been scattered (610) due to incorrect focal length. Moreover, it also added noise (611) to the captured image. This spreading (610) constitutes PSF, which should be targeted for use in the method of the present invention.

The PSF that caused the blurring can be changed according to the distance from the camera to the target object. Seeking to reduce the number of PSF's to be used, a sight (710) is created to frame the barcode, so the camera runs about the same distance from the source to the barcode filmed or photographed.

Figure 7:
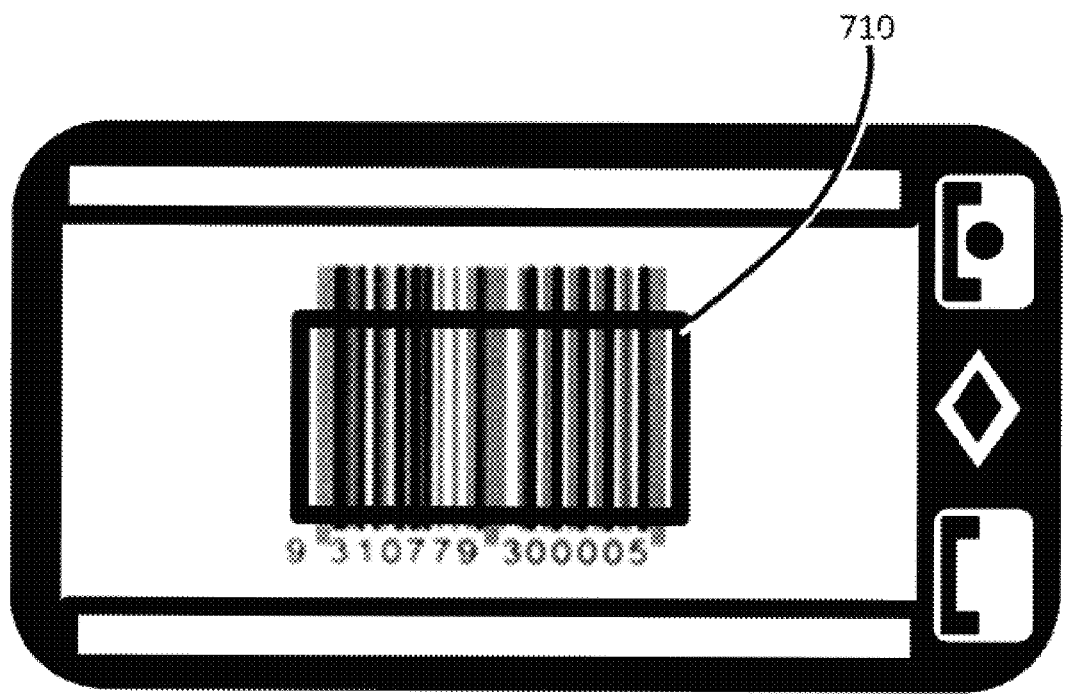
FIG. 7 illustrates the framework of the barcode in sight of the camera.

FIG. 7 illustrates how the barcode should be framed in the sight.

Figure 8:
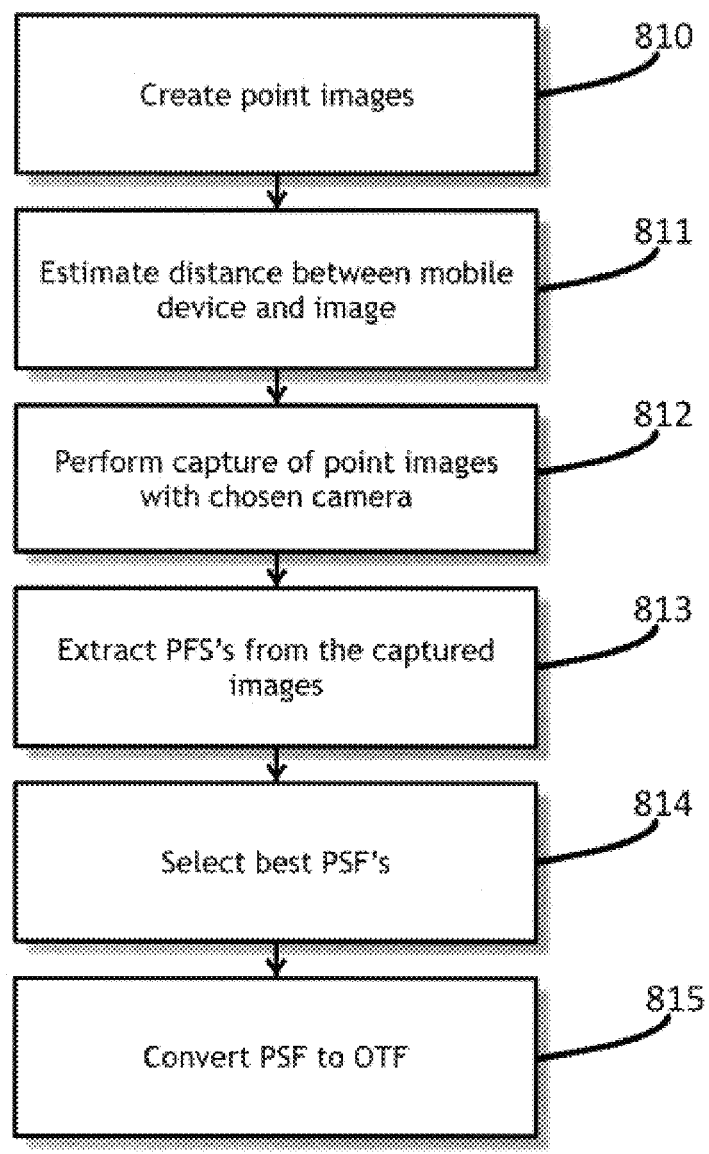
FIG. 8 is a block diagram of the extraction process of PSF's.

To restore the image and perform the decoding, first it is necessary to perform the camera calibration to obtain the PSF's. The steps for the calibration are shown in FIG. 8. The calibration consists of a process of capturing images of points at distances previously established, and, in turn, target points of the captured images.

As mentioned previously, to extract the PSF's, it is necessary to first create an image (810) with black and white dots representing the pixels. Before making the capture of images, first distances (811) should be stipulated wherein the portable device will be the same. This distance should reflect the position where the user fits the barcode in sight, because it is measured as the width of the barcode. As the barcodes on standard EAN-13 does not have a standard size, then pictures should be taken at different distances.

Figure 9:
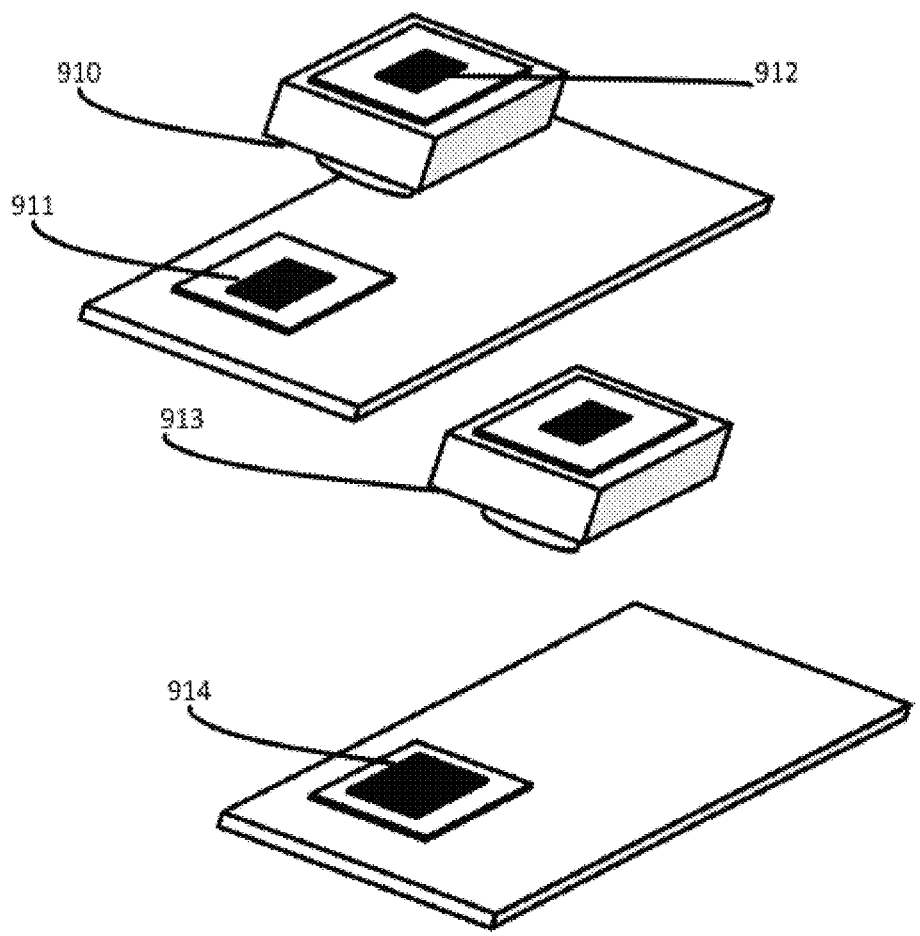
FIG. 9 shows how the process of capturing the image points of the target camera.
Figure 10:
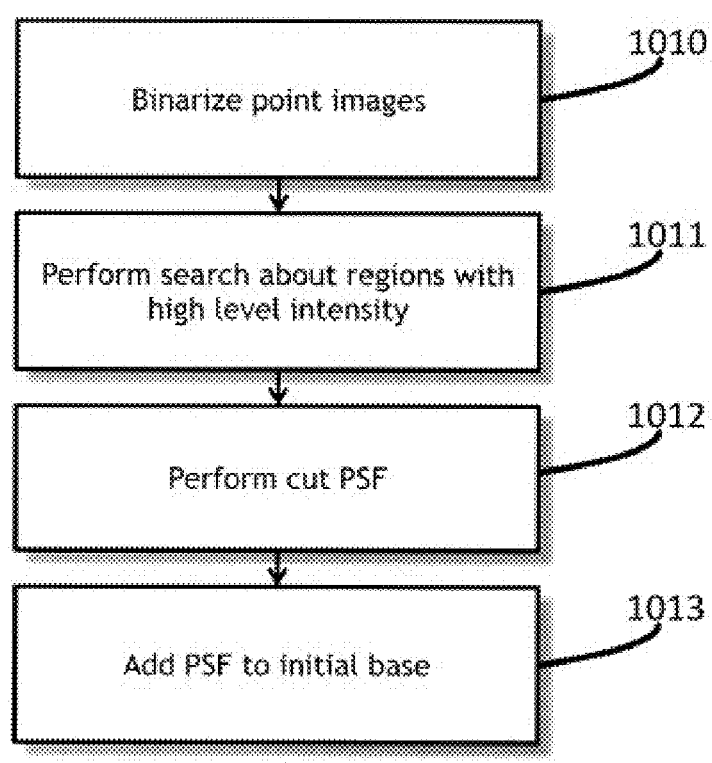
FIG. 10 is a block diagram of the segmentation process of the PSF's after capture by the target camera.

FIG. 9 illustrates the capture of the sizes of dots to two different barcodes, where the camera (910) is positioned framing an image white point (911) that has been resized depending on the size of a particular barcode. To capture this image is then necessary to fit it in the sight (912), simulating the user framing the barcode. Another image of white dots (914) appears which resizes the width of another barcode. In turn the camera should be repositioned (913) to frame the image. With this, it creates a base PSF's for different sized barcode.

Capturing these images should be made from the camera target (812). Models of different cameras can have different focal distances, making it necessary to get the base PSF's data concerning a particular camera.

After capturing the images, it's necessary to segment the PSF. For this, the image is digitalized to separate the image background of white pixels (1010). So, a sweep is performed on the digitalized image, searching for areas with high levels of intensity (1011). Then the white spots, which are now scattered in their neighborhoods, are cut and separated into individual images (1012). This image with the PSF is added to an initial database (1013) for further analysis.

Figure 11:
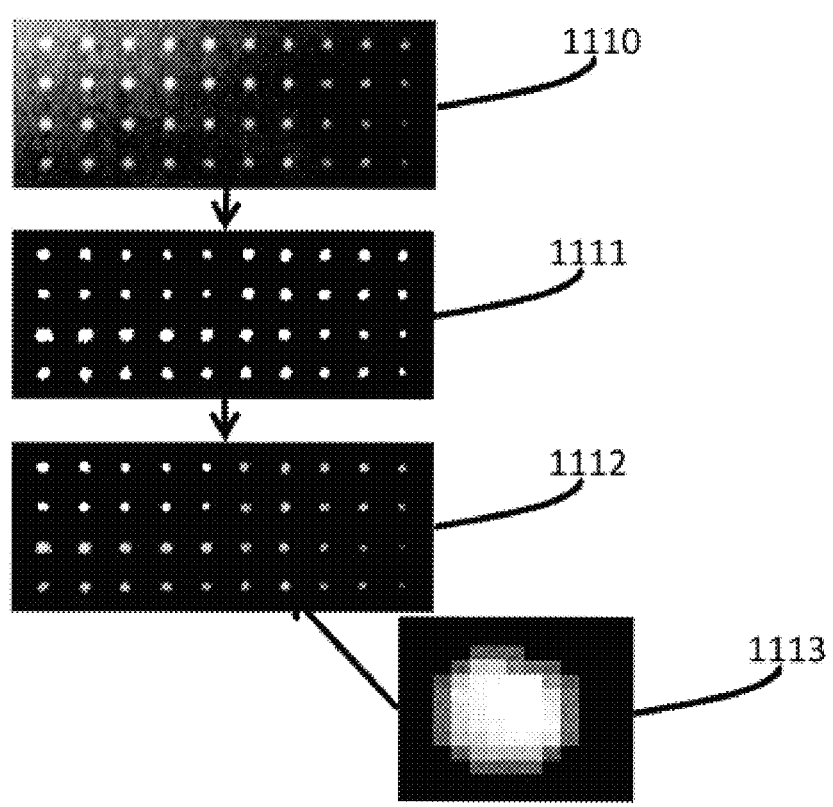
FIG. 11 illustrates the process for segmentation of PSF's.

FIG. 11 shows the process of extracting the PSF's, where the captured image (1110) is digitalized (1111) by creating a mask of the regions with the probable positions of the PSF's. Then, only the values of PSF's (1112) are copied, excluding the background image. Then each one of PSF's (1113) present the images is cut to store them separately on an initial basis. This initial basis is analyzed to select the best PSF's that restores the images (814). This check is made by a method that attempts to decode multiple barcodes applying blur PSF's base to restore the original image. The PSF's in which decoding is performed successfully and whose numbers are exactly equal to the numbers encoded by barcode will be selected.

According to the present invention, the deconvolution performed to remove the blurring is implemented in the frequency domain. Therefore, to avoid unnecessary processing, the PSF that is in the field of space OTF, is used to do convolution and deconvolution in the frequency domain. Then, the PSF's are normalized from a previously established range and the conversion to OTF is performed. This process will be explained in detail below.

After calibration of the camera and obtaining the respective OTF's for restoring the image, the process for reading the barcode itself is performed.

Figure 12:
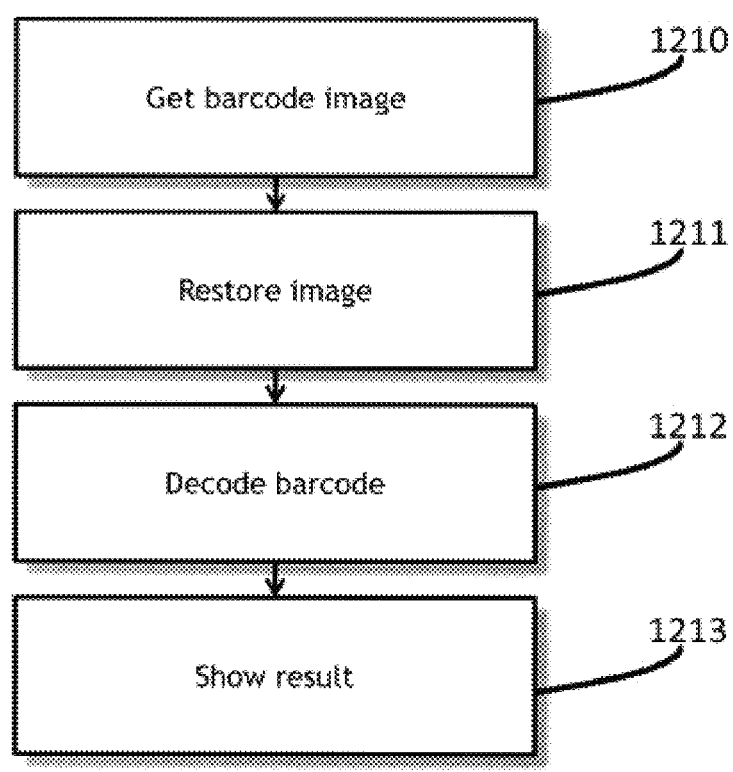
FIG. 12 is a block diagram of the restoration process and decoding of the barcode.

FIG. 12 illustrates the steps performed in the portable device when it starts reading the barcode.

The step "capturing the image with the barcode" (1210), which occurs in real time, is the time in which a filmed frame by the camera is selected and sent for decoding. In the system which was developed as one of the possible embodiments to the present invention, a button was created that is used to initialize capturing frames. At this time, the user must fit the barcode on sight as shown in FIG. 2. The capture of the images will be executed until the barcode is successfully decoded, or until the timeout is completed.

After capturing of the frame, step "restores image" (1211) begins. In this step, it selects one OTF in the database and performs a deconvolution. To describe the process of image restoration, it is necessary to describe mathematically how the scattering of pixels is performed and deduct it inversely until the results of the present invention.

The effect of blurring can be modeled mathematically as a convolution between the pixels and the PSF. This operation is shown in detail below:

$$b(x,y) = psf(x,y) * i(x,y) \qquad (1)$$

Equation (1) shows the mathematical model that describes how the scattering of the pixels occurs, and the symbol "*" is used to define the convolution operation of the PSF (x, y) and i (x, y) at the point (x, y), where i (x, y) is the ideal image.

The result of this convolution is the defocused image, represented by b(x, y). So, to remove the blurring effect, the reverse process is performed, where, from the blurred image, the original image is obtained.

$$i(x,y) = psf^{-1}(x,y) * b(x,y) \qquad (2)$$

Equation (2) provides image restoration using convolution, where i (x, y) is the ideal focused image, PSF-1 (x, y) is the inverse PSF b (x, y) represents the image blurring. Then, to remove the effect of blurring from the convolution operation, it is necessary to estimate the inverse PSF, and through the application of the convolution with the blurred image, it is possible to remove the scattering displayed in pixels.

It is known that the convolution of two functions in the space domain becomes transformed the product between these two functions in the frequency domain. Therefore, based on this property, the deconvolution in the frequency domain is given by dividing the transformed two functions. That is, the division between the transformed image and the blurred PSF will result in a transformed image ideal focused.

The transformed image in the frequency domain is obtained from a discrete Fourier transform. In turn, it applies the inverse Fourier transform to return to the spatial domain.

$$F(u, v) = \frac{1}{MN} \sum_{x=0}^{M-1} \sum_{y=0}^{N-1} f(x, y) \exp\left[-j2\pi\left(\frac{ux}{M} + \frac{vy}{N}\right)\right] \qquad (3)$$

The discrete Fourier transform is given by equation (3), where u=(0, 1, 2, ..., M−1) v=(0, 1, 2, ..., N−1).

$$f(x, y) = \sum_{u=0}^{M-1}\sum_{v=0}^{N-1} F(u, v)\exp\left[j2\pi\left(\frac{ux}{M} + \frac{vy}{N}\right)\right] \quad (4)$$

Equation (4) corresponds to the inverse Fourier transform, for x=(0, 1, 2, ..., M−1) y=(0, 1, 2, ... N−1), where Δu 1/MΔxe=Δv=1/NΔy.

The method of the present invention uses the algorithm of fast Fourier transform (FFT—Fast Fourier Transform) to calculate the discrete Fourier transform, since through this it is possible to reduce the complexity of $N^2$ to $N \log_2 N$ operations and in turn reduce the cost computational incurred in calculating transformed.

Equations (5) to (8) present a mathematical model used to cause blurring effect from frequency domain.

$$I(u,v)=FFT(i(x,y)) \quad (5)$$

$$PSF(u,v)=FFT(psf(x,y)) \quad (6)$$

$$B(u,v)=I(u,v)PSF(u,v) \quad (7)$$

$$b(x,y)=FFT^{-1}(B(u,v)) \quad (8)$$

Equation (5) calculates image transformation from the space domain (or spatial domain) to the frequency domain using the fast Fourier transform, represented by the FFT, where i (x, y) represents the ideal image focused in the area of space and I (u, v) is its image in the frequency domain.

Equation (6) performs the same calculations of the equation (5) where PSF (x, y) represents the point spread function in the space domain and PSF (u, v) is the same in the frequency domain.

Equation (7) adds the blurring effect of multiplying the PSF (u, v) I (u, v). Finally, the image is transformed into the domain of space again from the algorithm inverse fast Fourier transform, as shown in equation (8) by FFT-1, returning, in turn, the blurred image to the field Space b (x, y).

Figure 13:
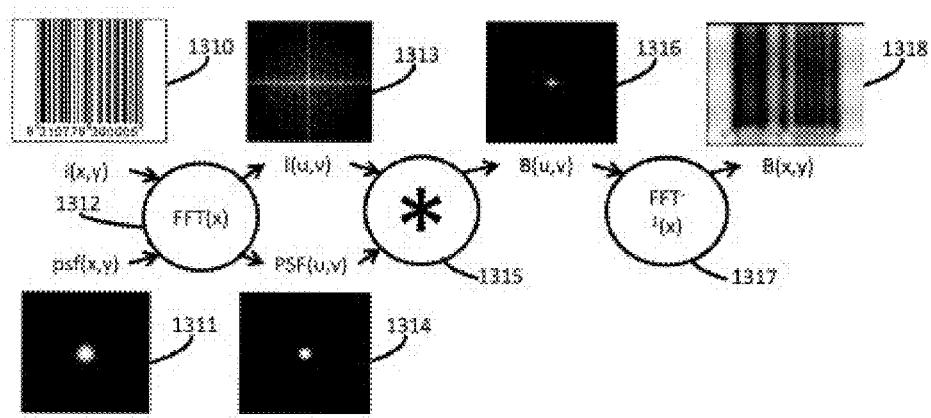
FIG. 13 illustrates the process of convolution in the frequency domain.

The process described in the previous paragraph is illustrated in FIG. 13. The barcode (1310) and PSF (1311) are in the space domain. Their Fourier transforms (1312) are calculated, obtaining the images in the frequency domain. The magnitude of the spectra of the transformed Barcode (1313) and PSF (1314) with origin shifted to the center are presented and represent the images in the frequency domain. Transforms are multiplied (convolution operation in the frequency domain) (1315) and inverse Fourier transform (1317) is applied to the result, obtaining the blurred image in the space domain (1318).

From the understanding of this information, the process performs a set of operations, where from the blurred image an optimal focused image is obtained. These operations are based on image deconvolution in the frequency domain, and dividing the transformed image blurred by its scattering transform function.

Equation (9) mathematically describes the deconvolution operation described in the preceding paragraph.

$$I(u, v) = \frac{B(u, v)}{PSF(u, v)} \quad (9)$$

The methods for processing images in order to obtain the ideal focused image:

$$N=2^{max(ceil(log2(col)),ceil(log2(lin)))} \quad (10)$$

To reduce the complexity and increase the speed of calculation of processing, the algorithm of fast Fourier transform used working with vectors or matrices whose dimensions are powers of 2. Equation (10) is used to obtain the proper dimensions for calculating the fast Fourier transform, where col is the number of columns, row the number of lines of the image and a function ceil is a value used for rounding up. Thus, the matrix used in calculating transformed to have equal dimensions N×N where N equals the highest power of base two rounded up between the powers of the number of columns and number of rows.

After obtaining the appropriate dimensions for calculating the transform, an array with these dimensions is created and copied to the image pixels for this matrix, which may result in a surplus space due to the difference between the dimensions. In general, if the space fills with excess zeros, to minimize edge effect often caused by the Fourier transform image, the image is copied to the center of the new matrix (1410) and makes up by mirroring this Up (1411) and down (1412).

Figure 14:
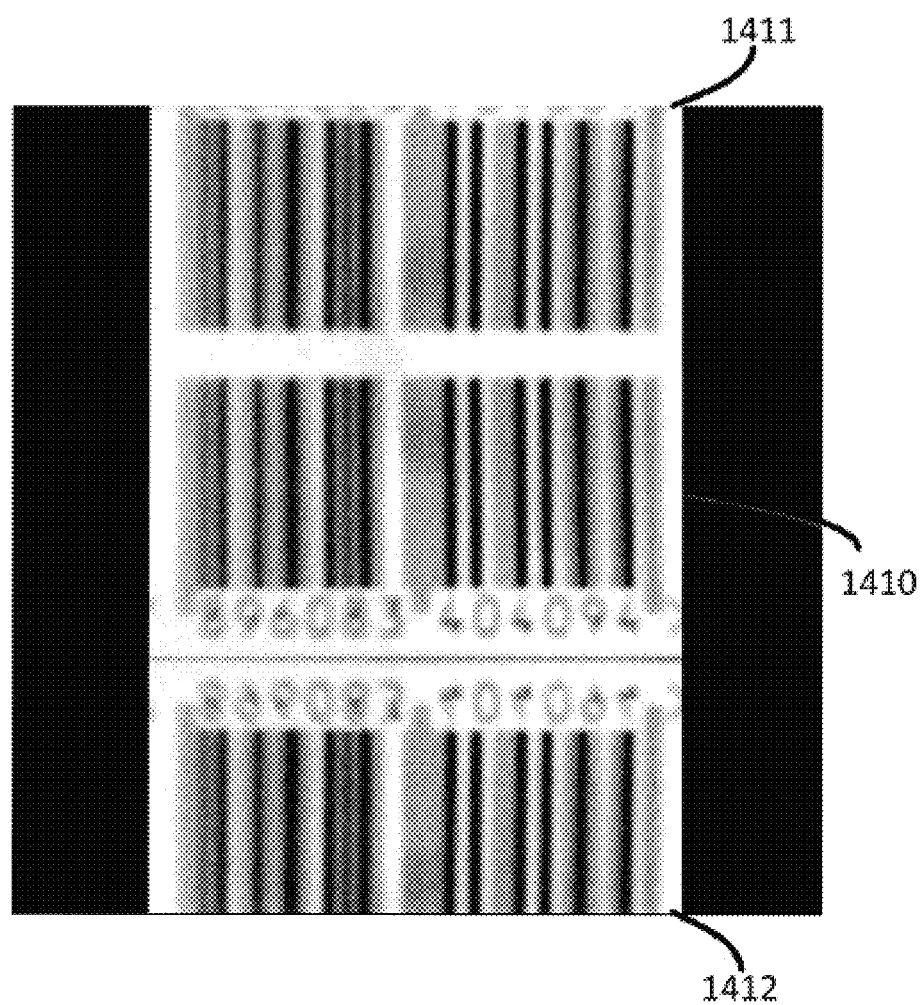
FIG. 14 shows the image of a barcode after mirroring.

FIG. 14 illustrates an input image for the fast Fourier transform.

The present invention has a base from which is extracted PSF's for the camera target. To decrease the processing, the PSF's are stored in the frequency domain in the form of an OTF. Thus, it is possible to eliminate the step of converting the OTF PSF for the portable device, thus reducing the computational cost while restoring the image.

Figure 15:
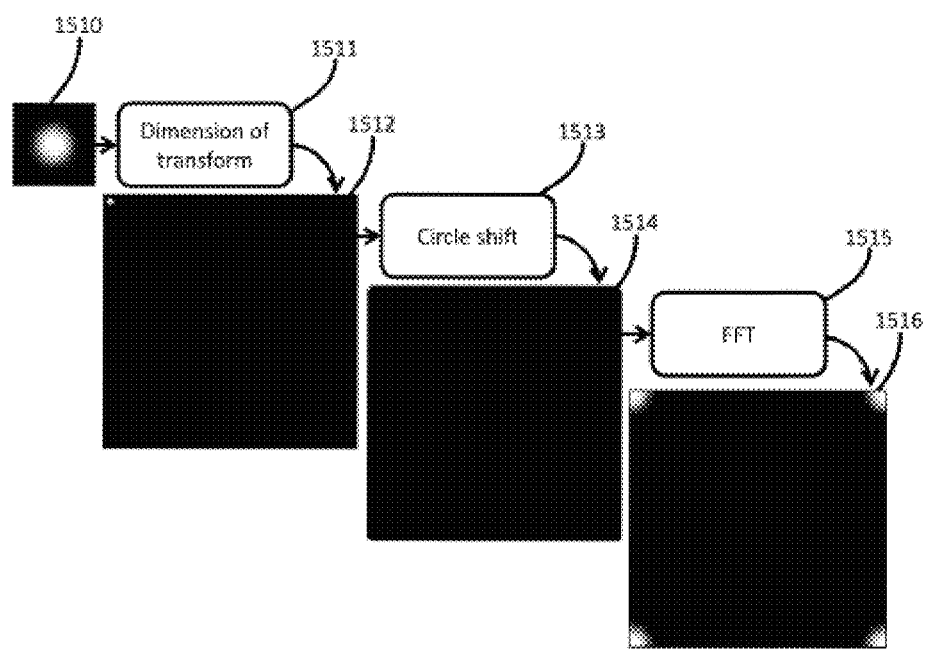
FIG. 15 illustrates a PSF for converting the OTF.

FIG. 15 illustrates the process of converting PSF for OTF. The PSF (1510) is copied to a new image (1511) with appropriate dimensions (1512) for calculating transformed. Then, the displacement is effected circular (1513) with the offset value equal to half the dimension of the PSF multiplied by −1, and repositioning the pixels in the new image as presented in 1514. The algorithm of fast Fourier transform (1515) is run, transforming the matrix of the space domain to the frequency domain, where the result will be the OTF, whose spectrum is shown for 1516. This OTF is stored and loaded onto the portable device to be used in image restoration while reading the barcode.

Figure 16:
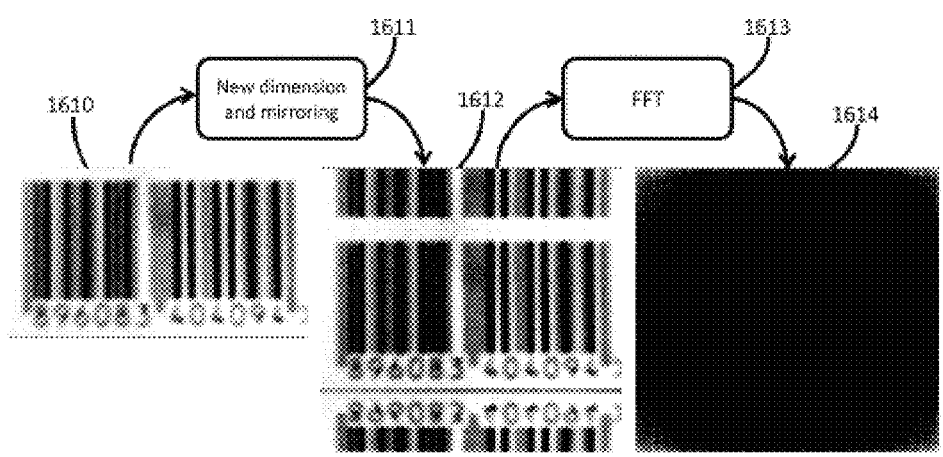
FIG. 16 illustrates the conversion of the image that is in the space domain to the frequency domain.

The process performed to calculate the transformed image in the frequency domain is presented in FIG. 16. The image of the barcode (1610) is copied into the center of an image with the appropriate dimensions to calculate the transform (1611), and mirroring (1612) of this is performed. The transform (1613) of the new image is calculated, the result of which spectrum is shown by 1614.

$$I(u, v) = \frac{B(u, v)}{OTF(u, v)} \quad (11)$$

$$I(u, v) = \frac{\overline{OTF(u, v)} \times B(u, v)}{\overline{OTF(u, v)} \times OTF(u, v)} \quad (12)$$

$$I(u, v) = \frac{\overline{OTF(u, v)} \times B(u, v)}{|OTF(u, v)|^2} \quad (13)$$

In equations 11 to 13, the symbol x represents conventional arithmetic multiplication. After obtaining the transform of the PSF and the transformed image is blurred, deconvolution is performed that may be modeled mathematically as equation (11), where it is given as a division between OTF (u, v) and B (u, v). Based on the properties of complex numbers, the numerator and denominator are multiplied by the conjugate of the OTF (u, v) as shown in equation (12). Equation (13) changes the denominator for |OTF (u, v)|$^2$, for a complex number multiplied by its conjugate equals its squared norm.

In equation (11) the problem may occur of dividing by zero or by many small numbers. To eliminate this problem, a number is determined that after dividing, the process does not result in inconsistent values. The denominator of the equation (13) is a real number, which facilitates comparisons made to obtain this number.

$$\lambda = \max(\overline{|OTF(u,v)|} \times B(u,v)|) \times \sqrt{\epsilon} \tag{14}$$

The equation (14) calculates the limit number for the denominator, which is represented by $\lambda$. This value is the highest value of the numerator multiplied by the root of $\epsilon$, where the value of $\epsilon$ is a small number that tends to zero.

$$D(u,v) = \begin{cases} |OTF(u,v)|^2, & \text{para } |OTF(u,v)|^2 \geq \lambda \\ \lambda, & \text{para } |OTF(u,v)|^2 < \lambda \end{cases} \tag{15}$$

$$I(u,v) = \frac{\overline{OTF(u,v)} \times B(u,v)}{D(u,v)} \tag{16}$$

The final mathematical representation for the operation of deconvolution used by the present invention for removing the blurring effect is given by equation (16), where the denominator D (u, v) is obtained from equation (15). This equation returns $\lambda$, where |OTF (u, v)|2 is smaller than $\lambda$, else returns |OTF(u, v)|2. Through this process, division by zero or very small numbers is avoided. The result of this equation, represented by I (u, v) is the restored converted image.

After deconvolution in the frequency domain, the ideal image of the targeted frequency domain is transformed back to the spatial domain, through the algorithm of fast inverse Fourier transform, thus getting the ideal image focused in the space domain.

Figure 17:
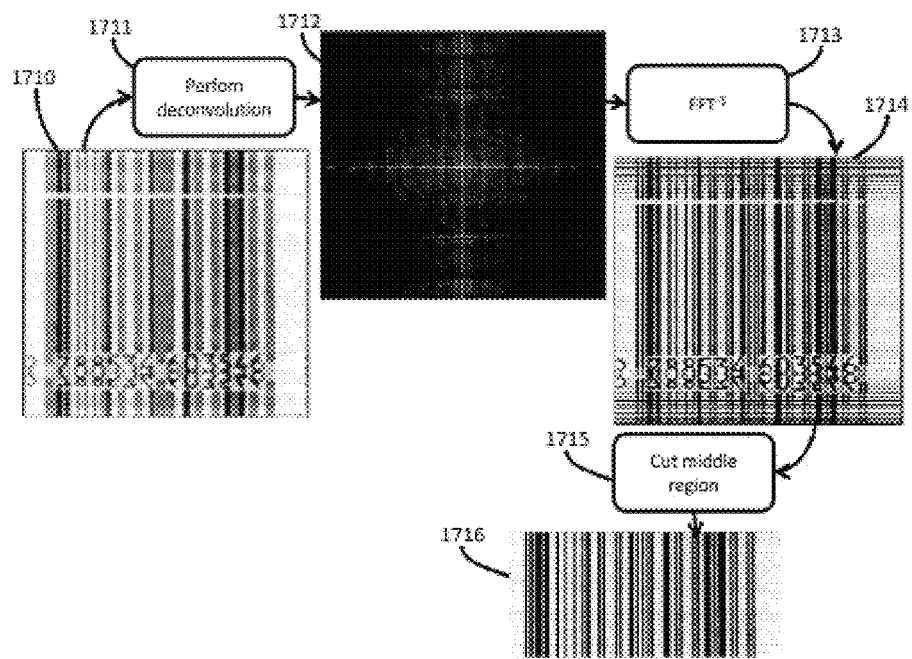
FIG. 17 shows the process the result of the restoration of the blurred image.

FIG. 17 shows the result of image restoration. The image of the barcode (1710) is prepared for the operation of deconvolution (1710) in the frequency domain. This operation results in a transformed image without a blurring effect. In 1712, the spectrum is displayed with the origin at the center of the resulting transform from the operation of deconvolution. Through the algorithm fast inverse Fourier transform (1713), the resulting transform is transformed to the domain of space, transforming it into the focused image (1714). Then the restored area (1715) is cut from the barcode restored (1716). This in turn is used as an input parameter to the algorithm for decoding the barcode.

Figure 18:
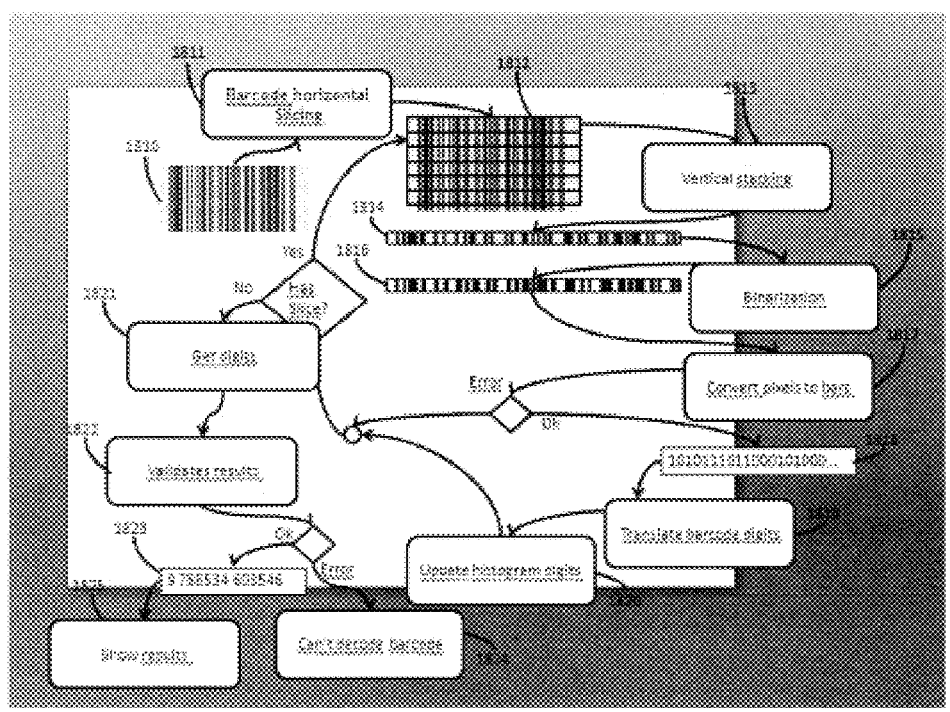
FIG. 18 shows the process of decoding the barcode after the image restoration.

After the image restoration, the step "decoding barcode" (1212) starts, which receives the image of the restored barcode to decode. This process is divided into sub-steps that perform image processing to return the numbers represented by the barcode in the image. This process is detailed by the flowchart in FIG. 18 and is described below.

The barcode (1810) present in the restored image is sliced horizontally (1811) and each of these slices is processed individually. The amount of horizontal slices is one of the inputs of barcode reader, and this is adaptive, i.e. depending on the implementation of barcode reading, the number of horizontal slices may be modified as to increase the amount of decoded digits. Each slice will return an array with the digits decoded, and the size of this vector is equal to the number of digits of the barcode in EAN-13 standard. The horizontal slicing is shown in 1812.

$$H_s = \text{floor}(H \times \beta) \tag{17}$$

$$N_s = \text{floor}\left(\frac{H - H_s}{H_s}\right) \tag{18}$$

$$\Delta_s = k \times H_s, \text{ com } k = 0, 1, 2, 3, \ldots, N_s \tag{19}$$

Equation (17) calculates the height of the horizontal slice where floor is a function that rounds down. The size of the slice is represented by Hs, which is a percentage defined by $\beta$, H, which represents the image height of the barcode. The number of horizontal slices is calculated using equation (18) represented by Ns. The offset between lines of the image of the barcode, represented by Ds is calculated from equation (19).

The barcode pattern in EAN-13 has only one dimension, i.e. the information is arranged in a line, and therefore needs to convert the horizontal slice, which is a two-dimensional array in a vector. This process is done through vertical stacking (1813) that transforms a two dimensional matrix in a vector (1814), and the values of the vector corresponds to the weighted average of the columns of the first matrix.

$$\mu_s(x) = \frac{1}{H_s} \times \sum_{y=\Delta_s}^{\Delta_s + H_s} i(x, y) \tag{20}$$

The vertical stacking is calculated as is shown by equation (20), converting the two-dimensional array represented by i (x, y) in vector μS (x). This vector stores the weighted averages of the columns between the $\Delta$s and $\Delta$s+Hs, where $\Delta$s is the vertical displacement and Hs is the number of rows of horizontal slices.

The next process is digitalizing (1815) the vector resulting from vertical stacking. This process will convert the values of this vector, which are among the range of 0 to 255, in just two values, black "0" and white "1" (1816). For this, a threshold is defined that separates the range of values that match the values that correspond to black and white. Due to adverse conditions such as the presence of image noise and lighting levels from the external environment, the range of values of the vector may vary, affecting the result of digitalization. Because of this, the vector is divided into regions and a threshold is computed for each of these regions. The threshold is a weighted average of the region multiplied by a weight belonging to a set of weights previously defined. These weights are used to adjust the threshold for different levels of illumination. If the value of the vector is less than the threshold, then black is assigned ("0") otherwise, white is assigned ("1"), resulting in another vector whose values are between 0 and 1.

$$w = \{w_1, w_2, \ldots, w_n\} \tag{21}$$

$$W_r = \frac{W}{R_n} \tag{22}$$

$$l_r = \left(\frac{1}{W_r} \times \sum_{x=x_r}^{W_r + x_r} \mu_s(x)\right) \times w_i \tag{23}$$

$$b(x) = \begin{cases} 1, & \text{para } \mu_s(x) >= l_r \\ 0, & \text{para } \mu_s(x) < l_r \end{cases} \tag{24}$$

In equations 21 to 24 the method is shown turning into bits vector. Equation (21) represents the set of weights used in calculating the thresholds. Equation (22) calculates the size of the regions in which the vector will be divided, where N represents the size of the vector, the amount Rn regions to be used and Wr is the size of the regions. The value of Rn is adaptive and can be changed to improve the result of decoding. The threshold is computed by equation (23), where xr is the beginning of region r represents a weight Wi in the set of weights and lr represents the threshold calculated for the region r. Finally, the equation (24) calculates the digitalized vector, where b (x) is white, "1" for μS (x) greater than or equal to LR or black "0" for μS (x) less than lr.

Figure 19:
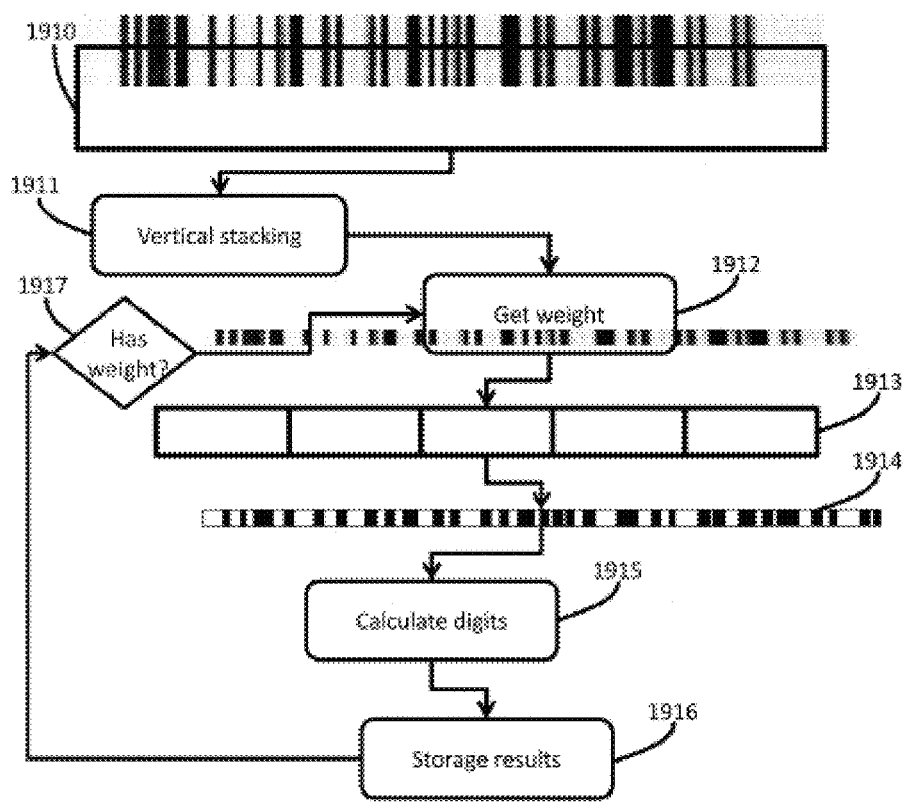
FIG. 19 illustrates the processing performed in the horizontal slice.
Figure 20:
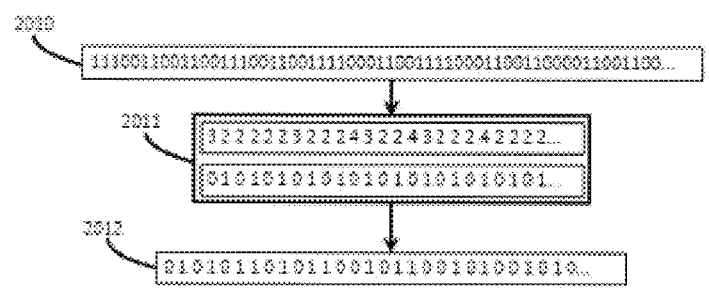
FIG. 20 shows the process of converting the pixels into bars.

The procedure described in the previous paragraph is detailed in FIG. 19. A horizontal slice (1910) is stacked vertically (1911) converting it into a vector. Then, the weight (1912) is obtained to be applied in calculating the threshold by dividing the array into regions (1913) and the threshold is calculated for digitalization (1914). After this, it is possible to identify the barcode and compute these digits (1915). The digits obtained are stored (1916) for later use. This process is repeated until all weights in the set of weights are used (1917).

The step for converting pixels bars (1817) receives the digitalized vector with pixel information and converts it to a vector representation of the barcode pattern on EAN-13, which is formed by four bars of different levels: "thin", "medium: 2 thin bars"; "wide: 3 thin bars", "very large: 4 thin bars." With this, a method estimates how many pixels each bar has. This method tries to find the amount of pixels of a thin bar and from this set the size of the other bars.

The digitalized vector (2010) is converted into two vectors, one of the bars with sizes in pixels and a second vector containing the color bars (black "0" or white "1") (2011). These vectors are utilized in the calculations performed during the conversion of pixels to bars. To obtain the correct sizes of each bar, the start of the barcode is located. It is known that the barcode in the standard EAN-13 starts with three thin bars interspersed between black and white. The beginning of the barcode is located when a black bar "0", a white bar "1", and a black bar "0", are found, whose biggest difference between the sizes of the bars is less than a threshold previously stipulated.

Figure 21:
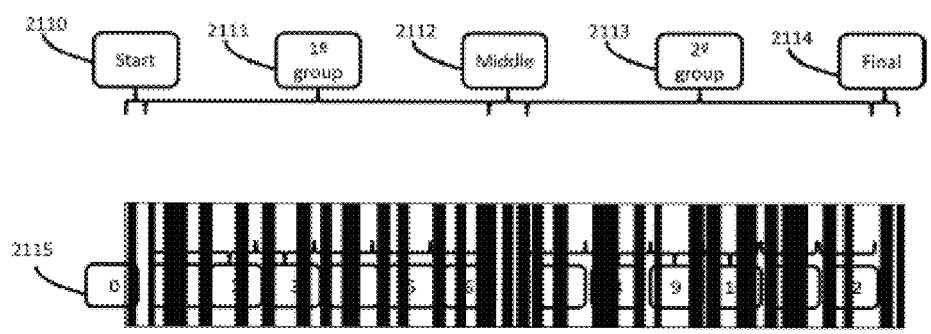
FIG. 21 shows the structure of the barcode pattern EAN-13.

FIG. 21 shows the structure of a barcode on EAN-13 standard. In this pattern, the first three bars (2110) are used to identify the beginning of the barcode and the last three bars (2114) identify the end of the barcode. The five centers of the bars (2112) divide the barcode into two groups where in the first group (2111) seven figures represents the initial barcode, and the first digit (2115) is defined by parity between the bars the first group. The second group (2113) represents the last six digits of the barcode. Each digit barcode is represented by four bars.

Thus, to effect the reading of the barcode, the first bars representing the beginning of the barcode are located. This procedure uses the vector with the sizes of bars in pixels and vector with the colors of the bars, shown in 2011. It is known that the beginning of the barcode pattern EAN-13 is represented by three thin bars with black, white, and black, respectively (2110). Therefore, an adaptive method attempts to locate this bar pattern from the difference between the largest sizes of three continuous bars. If this difference is less than the threshold used to represent the shortest distance between the sizes of the bars and the bar colors match the colors of the bars of the pattern that represents the start, then, the start of barcode was located.

$$M(v, x) = \underset{i \neq j}{\text{Max}}(|v(x + i) - v(x + j)|), \quad (25)$$

$$\forall i, j \mid i \in \{0, 1, 2\} e \; j \in \{0, 1, 2\}$$

The equation (25) calculates the difference between bars, where v is the vector with the size of the bars in pixels, and x is the displacement vector. If the value returned by M (v, x) is smaller than the lower threshold difference, then the first group of barcode begins at position x+v 3 vector. Therefore, the process begins translating the bars for the digits of the barcode from the position vector x 3+ to the size in pixels of the bars and with the vector containing the colors of the bars.

To perform the translation of the digits, the vectors are traversed every four bars to complete the six digits of the first group (2110). Then the five bars are discarded from the center (2112), for the translation of the last six digits of the second group (2113). In the translation of the first digit also the parities of these is calculated, representing the first digit barcode (2115).

Figure 22:
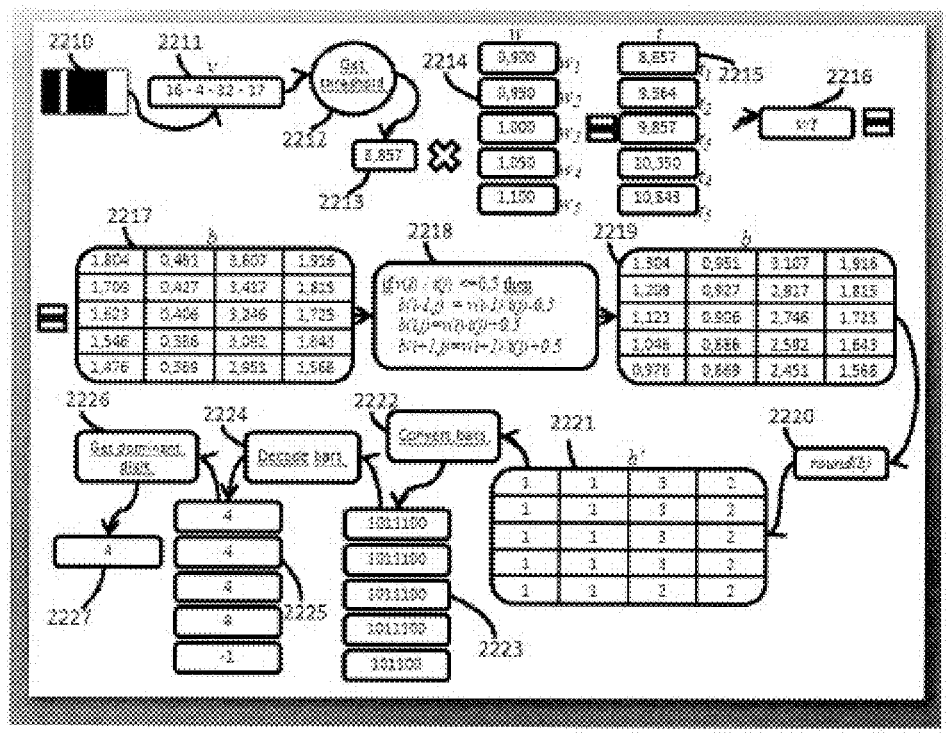
FIG. 22 describes the process of translation from bars to number.

FIG. 22 shows an example of implementation of the conversion process in the bars digits. In 2210, the bars are presented that represent the number four in the second group. The process uses a vector with the size of the bars in pixels (2211) and a second vector identifying the colors of the bars. From these, an adaptive method aims to convert the pixels in only four of bar levels: "1" for thin bar; "2" to mean bar; "3" for wide bar, "4" for very large bar.

It is known that each digit of the barcode is represented by seven thin bars. Therefore, the threshold used for setting the size of the bars is the thin bar (2212). The threshold size or thin bar is obtained through the sum of the length of the bars in pixels divided by seven (2213). Even after the restoration process of the image, picture noise can be found. These in turn affect the final result of decoding the barcode. To circumvent this problem, the method that converts the pixels bars adjusts the threshold at the time of translation. This adjustment is made by applying a set of weights threshold (2214), and generating different threshold values (2215).

The conversion of pixels to bars is done by dividing the size of the bars in pixels by thresholds obtained after the application of the weights (2216). The result is a matrix whose rows represent the results of different thresholds and the columns represent the sizes of the bars (2217).

Due to the presence of noise, there may be cases wherein the process for obtaining the sizes of the bars is damaged, causing some bars to have more pixels, and in turn, other bars to have less. That is, some bars will be thin and others extremely wide. To solve this problem, a method restores the size of the bar. This method tries to identify the bars that were very thin, seeking values which result from the division of the sizes of bars in pixels by the threshold lower than 0.5. 0.5 is then added to the bar which was very thin and 0.5 is subtracted from neighboring bars. This process is described in 2218 and an example of its result is presented in 2219.

The following procedure is the conversion of the resulting values to integers. The values (2220) are rounded, leaving only the integer part (2221). Then, the values obtained in bars are converted, which are represented by a combination of 0's (white bars) and 1's (black bars). This combination has seven elements, where each of these is a thin bar. A list of these combinations (2223) is obtained and the bars are decoded (2224) in search of the number represented by the latter. If successful, a list with decoded numbers is obtained. Should one or more digits not be decoded, a value of −1 is returned for each of these respectively (2225).

The result of the process described in the preceding paragraph is a list of probable numbers (2225) which may be represented by the bars decoded. So, from this list, to the method estimates the number most likely to be represented by the bars decoded. This is done by calculating the dominant digit (2226), which is the number other than −1 more frequently in the list of numbers decoded, as presented in 2227. With this, the process performs translating the digits of the barcode (1819).

The process of digitalization (1815), conversion of pixels for bars (1817), and translation of the digits of the barcode (1819) generates a vector with thirteen positions that contains the possible values of the numbers represented by the barcode. These operations are performed in each of horizontal slices, generating in turn a vector of results for each of the slices. These vectors are used to construct a histogram of digits (1820), which is used to obtain the number represented by the barcode.

Figure 23:
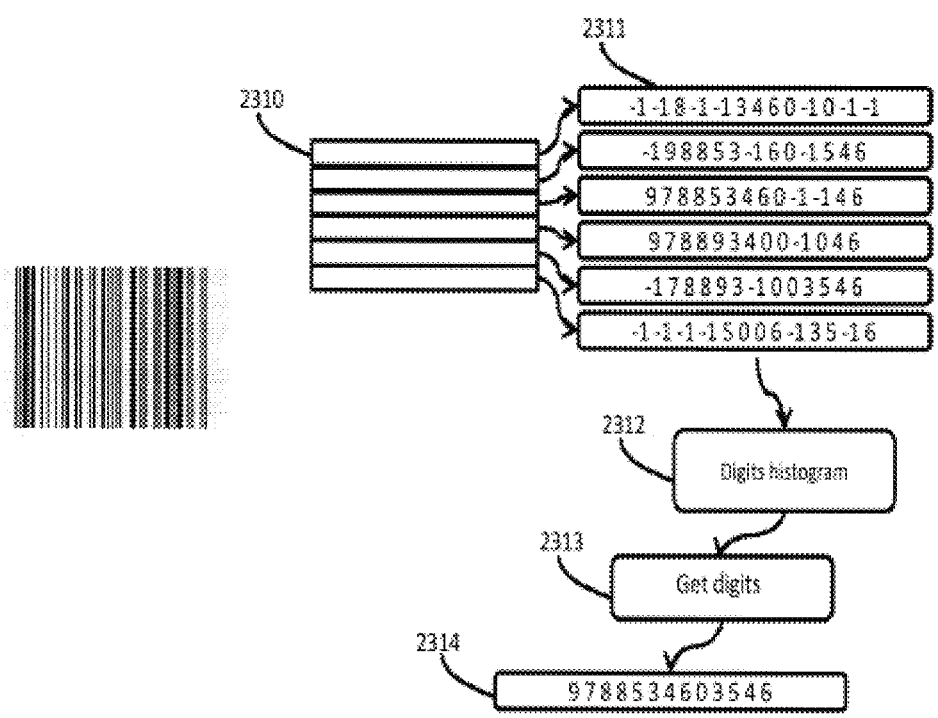
FIG. 23 illustrates the process of obtaining the final result.
Figure 24:
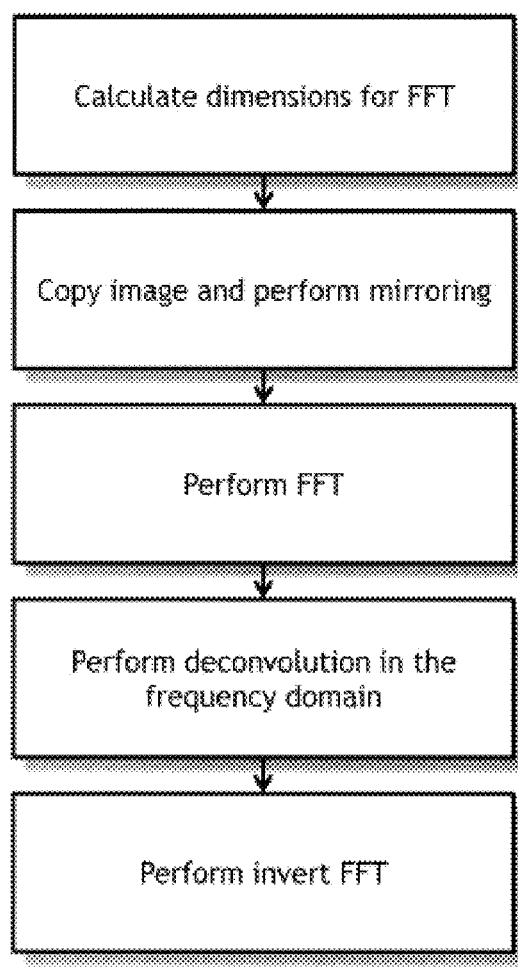
FIG. 24 illustrates a process of obtaining a focused image from a blurred image.

By the histogram of digits that is generated from the decoding of horizontal slices, the process attempts to reach an optimal outcome. FIG. 23 illustrates the process of obtaining the histogram digit and generating the final result.

Each horizontal slice of the code (2310) is decoded separately returning a sequence of digits decoded for each slice (2311). In case of failure in decoding single digits, is assigned the value −1 (minus one) in position.

To obtain the final value a histogram of digits is calculated (2312). The frequency of this histogram is affected by the amount of numbers returned successfully during decoding.

$$s(x) = \begin{cases} 0, & \text{para } u_i(x) = -1 \\ 1, & \text{para } u_i(x) \neq -1 \end{cases} \quad (26)$$

$$inc = \sum_{x=0}^{n} s(x), \text{ onde } n = 12 \quad (27)$$

$$H(y, x) = H(u_i(x), x) + inc, \text{ se } u_i(x) \neq -1 \quad (28)$$

The process for obtaining the histogram of digits is presented in equations 26 to 28. Equation (26) returns 0 (zero) if the digit is equal to −1 (minus one), otherwise returns 1 (one), where $u_i$ is a vector with the sequence of digits returned in decoding a slice whose index is represented for i. Equation (27) calculates the increment of the histogram, where it is equal to the number of elements ui different from −1 (minus one). Equation (28) increments a value in the histogram represented by H, where y is a digit to increment, and x is the position of that digit in the barcode. The histogram will have value only if the updated value ui at position x is different from −1 (minus one).

$$R(x) = \underset{y \in \{1,2,3 \ldots ,9\}}{\operatorname{argmax}} H(y, x) \quad (29)$$

After calculating the histogram of digits, then we obtain the numbers represented by the barcode (1821) (2313), which are those most frequently in the histogram of digits. This process is shown by equation (29) where y represents the numbers barcode exact position thereof. The end result of decoding is shown in equation (29) for R, stored in a vector with thirteen (13) positions.

The next process is the validation of the result (1822), wherein from this the method analyzes the sequence of numbers returned in decoding in order to verify that this is a valid string. For this, first it is verified whether all the digits have been decoded correctly. If all numbers have been successfully decoded, then it calculates the check digit. If the checksum is correct, then the decoded string is valid.

In the event of an error, a new frame is captured and the process is carried out again until the barcode is successfully decoded or until a reading timeout is ended.

When the decoding of a barcode is successfully performed, then the step "displays the result" (1213) begins. At this step, the decoded code is displayed on the portable display. From this result, it is possible to carry out research on the selling points provided for the product identified by the barcode decoded and see the price of this.

Although a preferred embodiment of the present invention is shown and described, those skilled in the art will understand that various modifications may be made without departing from the scope and spirit of the invention as defined in the appended claims.

It is also expressly stated that all combinations of elements which perform the same function in substantially the same way to achieve the same results are within the scope of the invention.

The invention claimed is:

1. A method for restoring an image of a blurred barcode, the method comprising:
   capturing the image;
   restoring the image by selecting one Optical Transfer Function (OTF) in a database and performing deconvolution on the image;
   decoding the barcode in the restored image to return numbers represented by the barcode; and
   displaying the returned numbers,
   wherein, in the deconvolution of the barcode, a cutting threshold is determined, which adjusts to ambient lighting, to separate a white level from a black level in the barcode image in grayscale.

2. The method of claim 1, wherein the image comprises black and white dots representing pixels.

3. The method of claim 1, wherein pixels are spread due to incorrect focal length, and the spreading comprises a Point Spread Function (PSF), which is to be segmented for use.

4. The method of claim 3, wherein the deconvolution of the blurred image using the PSF or OTF estimates an image closest to the ideal for decoding the barcode, removing the blurring effect caused by the pixel spreading of the barcode image, and increasing a success rate of the method.

5. The method of claim 3, further comprising a procedure for camera calibration which creates a database of PSF's, reflecting the impact of the blurring effect at a given point from a given distance, and the PSF's of this database are used in deconvolution that removes the blurring effect and restores the image with the barcode.

6. The method of claim 5, further comprising extracting static PSF's for use in the deconvolution.

7. The method of claim 5, wherein the PSF data-base comprises data concerning a particular camera according to different models of cameras having different focal lengths.

8. The method of claim 3, wherein a bank of PSF's are estimated.

9. The method of claim 1, further comprising:
   digitalizing the captured image by creating a mask of regions with probable positions of Point Spread Functions (PSF's);
   copying only values of PSF's, excluding a background image;
   cutting each one of PSF's present in the image to store them separately in an initial database, said database being analyzed to select the initial PSF's that best restore the image;
   verifying by decoding multiple barcodes applying blur PSF's from the database to restore the image;
   wherein the PSF's in which decoding is performed successfully are PSF's whose numbers are exactly equal to the numbers encoded by the selected barcodes.

10. The method of claim 1, wherein a size of a bar in the barcode is estimated considering a threshold based on the specific characteristics of dimensions of the barcode used in EAN-13.

11. The method of claim 1, wherein the image restoring enables the use of devices with no auto-focus.

12. The method of claim 1, further comprising performing real-time processing, and analyzing frames obtained in a preview mode.

13. The method of claim 1, wherein regions which do not belong to the barcode are excluded from processing.

14. The method of claim 1, wherein the barcode is sliced horizontally and reading is performed on each of these individual slices.

15. The method of claim 14, wherein the number of slices is adjusted according to performance, so that slices of different positions and sizes are obtained, thus increasing the probability of success in decoding.

16. The method of claim 14, wherein the slice to be decoded is divided into vertical regions and for each slice, a threshold is obtained in accordance with a pixel intensity.

17. The method of claim 1, wherein the decoding of barcodes is performed on images taken by cameras having low cost and fixed focus.

18. The method of claim 1, further comprising mirroring the image of the barcode.

* * * * *